US012026983B2

(12) United States Patent
Nakai et al.

(10) Patent No.: US 12,026,983 B2
(45) Date of Patent: *Jul. 2, 2024

(54) INFORMATION OUTPUT METHOD, INFORMATION OUTPUT DEVICE, AND PROGRAM

(71) Applicant: Panasonic Intellectual Property Corporation of America, Torrance, CA (US)

(72) Inventors: Kentaro Nakai, Hyogo (JP); Hiroko Sugimoto, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/839,767

(22) Filed: Jun. 14, 2022

(65) Prior Publication Data

US 2022/0309838 A1 Sep. 29, 2022

Related U.S. Application Data

(60) Division of application No. 17/025,362, filed on Sep. 18, 2020, now Pat. No. 11,393,259, which is a (Continued)

(30) Foreign Application Priority Data

Mar. 8, 2019 (JP) .................................. 2019-042631

(51) Int. Cl.
*G06V 40/70* (2022.01)
*G06F 3/14* (2006.01)
(Continued)

(52) U.S. Cl.
CPC .............. *G06V 40/70* (2022.01); *G06V 40/10* (2022.01); *G06V 40/172* (2022.01); *G06V 40/20* (2022.01);
(Continued)

(58) Field of Classification Search
CPC ..... G06K 7/10326; G06K 2007/10504; G06K 9/00892; G06K 9/00288; G06K 9/00335;
(Continued)

(56) References Cited

U.S. PATENT DOCUMENTS 10,467,879 B2 * 11/2019 Stefanski ........... G08B 21/0423
2015/0002291 A1 * 1/2015 Kizuki ..................... G08B 1/08
340/539.11
(Continued)

FOREIGN PATENT DOCUMENTS

JP 2003-162626 6/2003
JP 2010-16432 1/2010
(Continued)

OTHER PUBLICATIONS

Office Action issued Dec. 9, 2021 in U.S. Appl. No. 17/025,362.
(Continued)

*Primary Examiner* — Nizar N Sivji
(74) *Attorney, Agent, or Firm* — Wenderoth, Lind & Ponack, L.L.P.

(57) ABSTRACT

An information output method in an information output device acquires first information on an operation history of one or more devices operated by one or more users, acquires second information that identifies a user detected in the vicinity of one or more output devices, acquires third information on behavior of the user, identifies a device whose state is changed or whose state is changeable within a predetermined time among the one or more devices and an operator who performs operation relating to the change in
(Continued)

the state based on the first information, determines an output mode and content of notification information on the identified device to the detected user based on information on the identified device and operator, the second information, and the third information, and outputs, in the determined output mode, notification information having the determined content to one or more output devices that detect the detected user.

11 Claims, 11 Drawing Sheets

Related U.S. Application Data continuation of application No. PCT/JP2019/043953, filed on Nov. 8, 2019.

(51) Int. Cl.
  *G06F 3/16* (2006.01)
  *G06V 40/10* (2022.01)
  *G06V 40/16* (2022.01)
  *G06V 40/20* (2022.01)
  *H04W 4/021* (2018.01)

(52) U.S. Cl.
  CPC ............... *H04W 4/021* (2013.01); *G06F 3/14* (2013.01); *G06F 3/167* (2013.01)

(58) Field of Classification Search
  CPC .. G06K 9/00362; H04W 80/04; H04W 12/06; H04W 28/0247; H04W 48/02; H04W 4/021; H04W 4/33; G06F 11/3438; G06F 21/55; G06F 3/14; G06F 3/167; G06F 3/01; H04L 41/0859; H04L 47/2475; H04L 12/2823; H04L 67/125; H04L 67/22; G09G 2320/0261; G09G 2354/00
  See application file for complete search history.

(56) References Cited

U.S. PATENT DOCUMENTS

| | | | |
|---|---|---|---|
| 2015/0074554 A1* | 3/2015 | Sasaki | H04L 12/1813 715/753 |
| 2015/0261387 A1 | 9/2015 | Petersen et al. | |
| 2016/0057374 A1* | 2/2016 | Kim | G06F 3/01 348/734 |
| 2016/0307413 A1* | 10/2016 | Rafii | G08B 21/18 |
| 2018/0046788 A1* | 2/2018 | Ohtani | G06F 21/316 |
| 2018/0173544 A1* | 6/2018 | Hyodo | G06F 3/013 |

FOREIGN PATENT DOCUMENTS

| | | | |
|---|---|---|---|
| JP | 2013-162314 | | 8/2013 |
| JP | 2013-258656 | | 12/2013 |
| JP | 2013258656 A | * | 12/2013 |
| JP | 2014-145990 | | 8/2014 |
| JP | 2016-177845 | | 10/2016 |
| WO | 2017/002488 | | 1/2017 |
| WO | 2020/183785 | | 9/2020 |

OTHER PUBLICATIONS

International Search Report issued Feb. 4, 2020 in International (PCT) Application No. PCT/JP2019/043953.
Ubiquitous Sensors based Human Behavior Modeling and Recognition using a Spatio-Temporal Representation of User States (Year: 2004).

* cited by examiner

FIG. 4

| ID | OPERATION DATE AND TIME | HOUSE ID | OPERATOR ID | DEVICE ID | DEVICE NAME | SETTING PARAMETER | OPERATION STATE | NOTIFICATION MANAGEMENT |
|---|---|---|---|---|---|---|---|---|
| 001 | DECEMBER 17, 2018 10:01 | H001 | U00A | D001 | WASHING MACHINE | AUTOMATIC COURSE DETERGENT XX | DEHYDRATING 15 MINUTES REMAINING | YET TO BE PERFORMED |
| 002 | DECEMBER 17, 2018 10:30 | H001 | U00B | D002 | AIR CONDITIONER | HEATING TO 24°C | STOPPED | — |
| 003 | DECEMBER 17, 2018 11:30 | H001 | U00C | D003 | MICROWAVE OVEN | PREHEATING OVEN TO 150°C | COMPLETED | YET TO BE PERFORMED |

T1

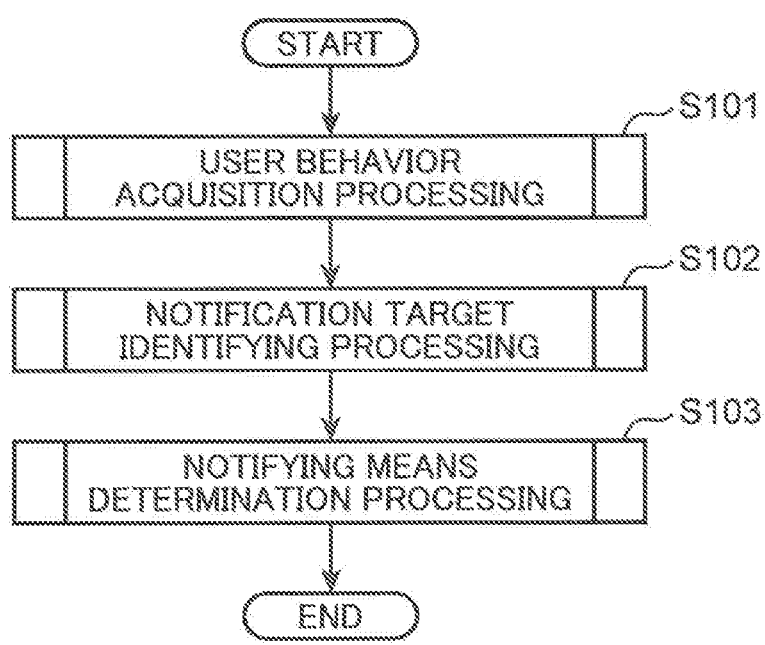

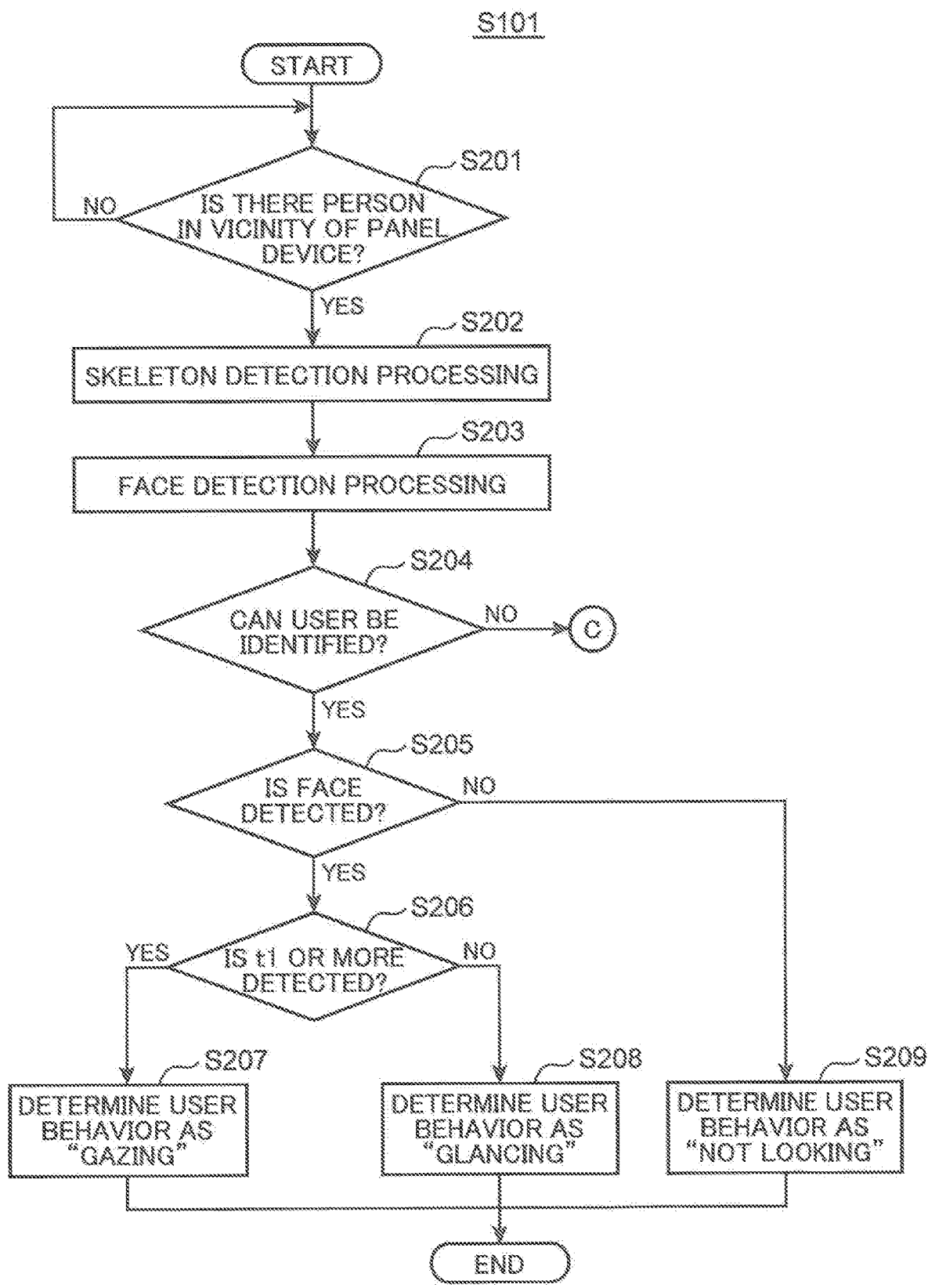

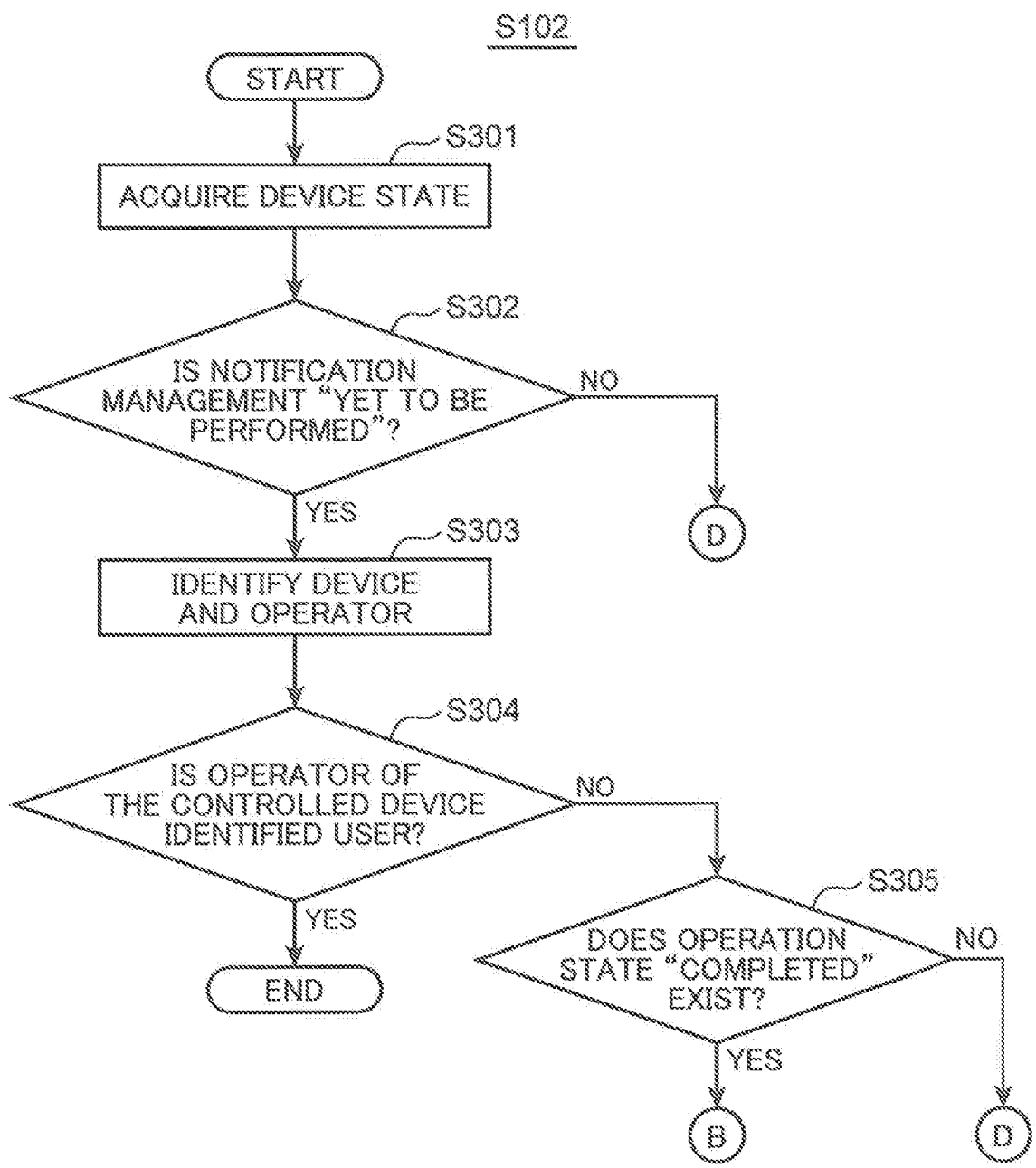

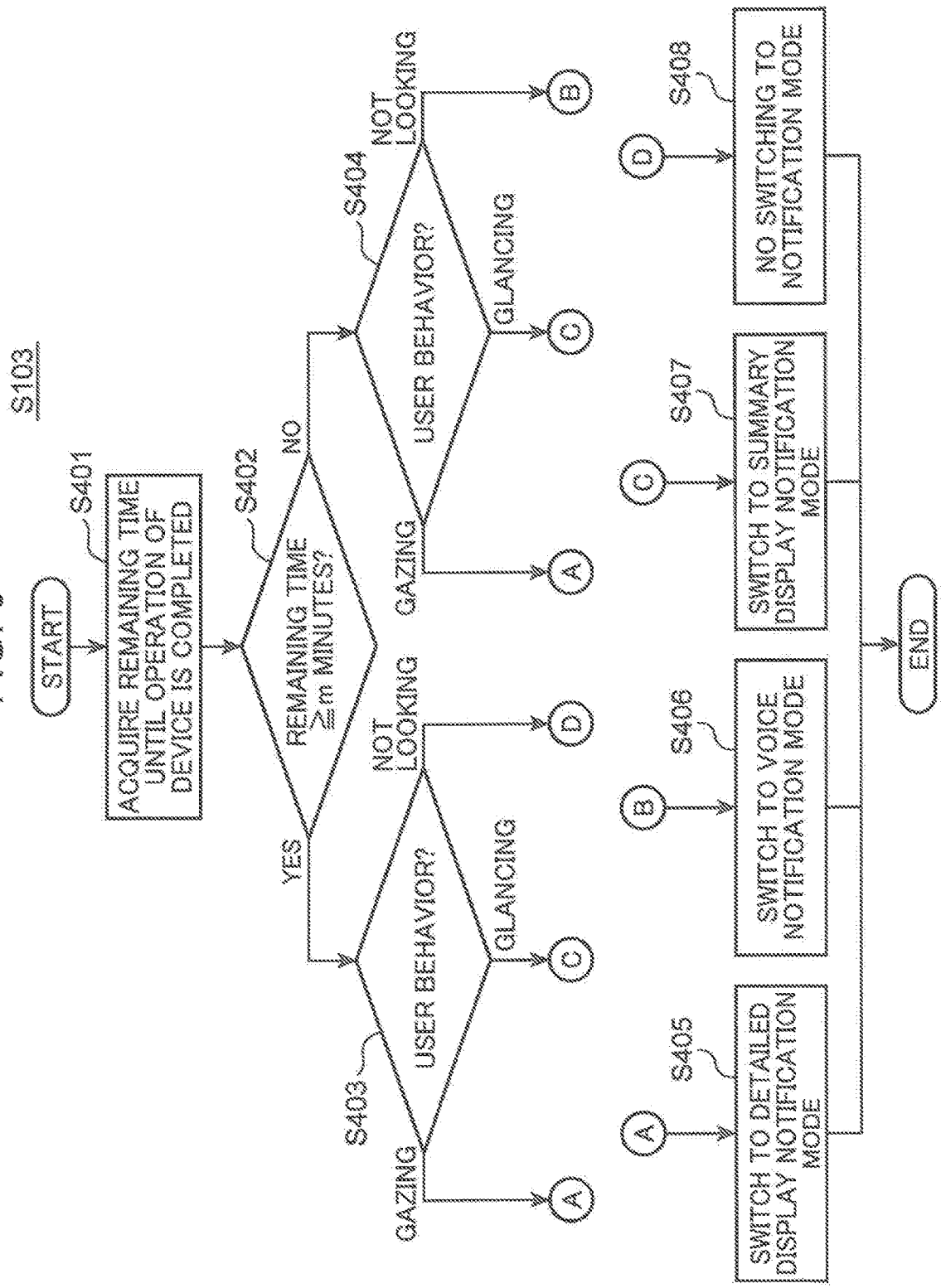

INFORMATION OUTPUT METHOD, INFORMATION OUTPUT DEVICE, AND PROGRAM

TECHNICAL FIELD

The present disclosure relates to an information output method, an information output device, and a program for outputting information on a device.

BACKGROUND ART

Conventionally, a technique of outputting information to a plurality of displays disposed in an environment is known. For example, Patent Literature 1 discloses a method of identifying a user existing near a display and displaying content associated with the user on the display until the user arrives at a destination. Further, Patent Literature 2 discloses a method of detecting the orientation of a face of a user in the vicinity of a display unit that includes a touch panel shared by a plurality of users in a case where the users operate the display unit, and changing the size of an operation object being displayed in accordance with the detected orientation of the face.

CITATION LIST

Patent Literature

Patent Literature 1: Japanese Patent Laid-Open No. 2014-145990
Patent Literature 2: Japanese Patent Laid-Open No. 2016-177845

SUMMARY OF INVENTION

However, in the technique disclosed in Patent Literature 1, the user near the display is identified, and the content associated with the identified user is displayed. For this reason, in a case where the user does not move near the display at home or the like, notifying information when necessary in view of the user's state has been difficult.

Further, the technique disclosed in Patent Literature 2 changes an operation object output to the display unit according to the orientation of the face of the user in the vicinity of the display unit. For this reason, acquiring information has been difficult unless the user approaches the display unit until the operation becomes possible.

The present disclosure has been made in view of the above problems, and an object thereof is to provide an information output method, an information output device, and a program that can notify a user in the vicinity of an output device of information on a device having the content according to the behavior of the user in an output mode according to the behavior of the user.

An information output method according to an aspect of the present disclosure is an information output method in an information output device that outputs information to one or more output devices used by one or more users. The information output method acquires first information on an operation history of one or more devices operated by the one or more users, performs processing of acquiring second information that identifies a user detected in a vicinity of the one or more output devices, acquires third information on behavior of the user detected in the vicinity of the one or more output devices, identifies a device whose state is changed or whose state is changeable within a predetermined time among the one or more devices and an operator who performs operation relating to the change in the state based on the first information, determines an output mode and content of notification information on the identified device to the detected user based on information on the identified device and operator, the second information, and the third information, and outputs, in the determined output mode, notification information having the determined content to one or more output devices that detect the detected user.

According to the present disclosure, a user in the vicinity of the output device can be notified of information on a device having content corresponding to the behavior of the user in an output mode corresponding to the behavior of the user.

BRIEF DESCRIPTION OF DRAWINGS

FIG. 4 is a diagram showing an example of an operation history information table.
FIG. 6 is a flowchart showing entire operation of the notification system.
FIG. 7 is a flowchart showing an example of user behavior acquisition processing.
FIG. 8 is a flowchart showing an example of notification target identifying processing.
FIG. 9 is a flowchart showing an example of notifying means determination processing.

Figure 1:
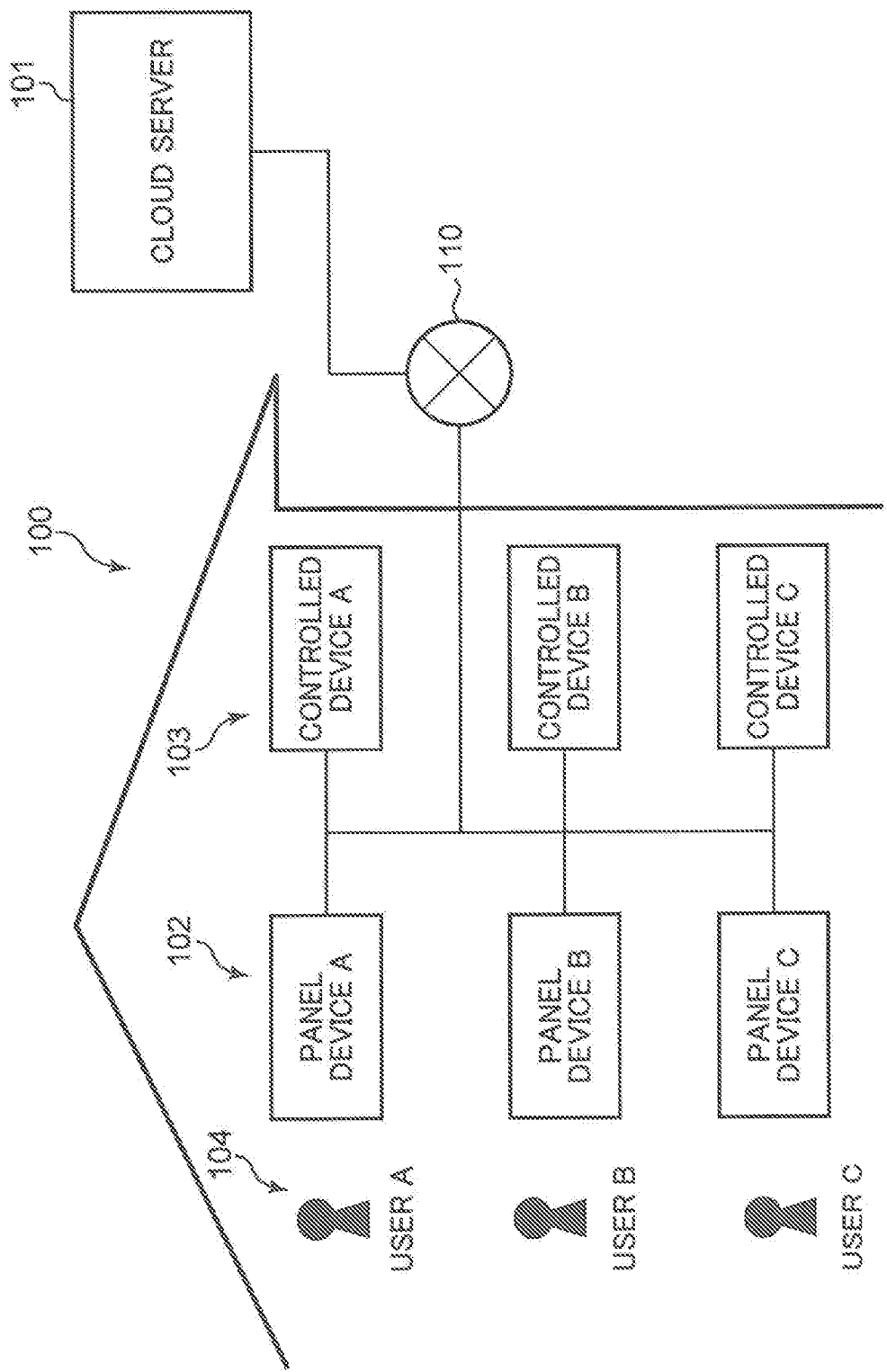
FIG. 1 is a diagram showing an example of an entire configuration of a notification system in a first embodiment.

DESCRIPTION OF EMBODIMENTS (Knowledge that Forms the Basis of the Present Disclosure)

Hereinafter, the knowledge that forms the basis of the present disclosure will be described. In recent years, a method of identifying a user and notifying content suitable for the user has been studied. In particular, in an environment such as a home, where a plurality of users share a device, relax, and live, it is important to notify necessary information to a user, who needs to be notified about a device, only when the information is necessary without causing interference with other users.

However, even for the same user, there are a situation in which notification is necessary and a situation in which notification is not necessary. Further, there may also be a user who does not need notification. For this reason, performing notification to each user in a uniform manner is difficult. Further, in order to efficiently perform a daily activity in an environment, there is a case where the user needs to check notification information while doing other work. On the other hand, there is a case where notification is not necessary, such as during family gatherings.

However, in the past, no technical solution has been studied for notifying information in a mode and with the content suitable to the behavior of the user in one or more output devices such as a panel device installed in each room.

The present disclosure has been made in order to solve the above problems, and an object thereof is to provide an information output method, an information output device, and a program that can notify a user near an output device of information on a device having the content corresponding to the behavior of the user in an output mode corresponding to the behavior of the user.

An information output method according to an aspect of the present disclosure is an information output method in an information output device that outputs information to one or more output devices used by one or more users. The information output method acquires first information on an operation history of one or more devices operated by the one or more users, performs processing of acquiring second information that identifies a user detected in a vicinity of the one or more output devices, acquires third information on behavior of the user detected in the vicinity of the one or more output devices, identifies a device whose state is changed or whose state is changeable within a predetermined time among the one or more devices and an operator who performs operation relating to the change in the state based on the first information, determines an output mode and content of notification information on the identified device to the detected user based on information on the identified device and operator, the second information, and the third information, and outputs, in the determined output mode, notification information having the determined content to one or more output devices that detect the detected user.

Further, an information output device according to an aspect of the present disclosure is an information output device that outputs information to one or more output devices used by one or more users. The information output device includes a first acquisition unit that acquires first information on an operation history of one or more devices operated by the one or more users, a second acquisition unit that performs processing of acquiring second information that identifies a user detected in a vicinity of the one or more output devices, a third acquisition unit that acquires third information on behavior of a user detected in the vicinity of the one or more output devices, an identification unit that identifies a device whose state is changed or whose state is changeable within a predetermined time among the one or more devices and an operator who performs operation relating to the change in the state based on the first information, a determination unit that determines an output mode and content of notification information on the identified device to the detected user based on information on the identified device and operator, the second information, and the third information, and an output unit that outputs, in the determined output mode, notification information having the determined content to one or more output devices that detect the detected user.

According to these aspects, based on the first information, a device whose state is changed or whose state is changeable within a predetermined time among one or more of devices and an operator who performs operation relating to the change in the state are identified. Then, to one or more output devices that detect a user identified by the second information in the vicinity, notification information is output in an output mode determined based on the information on the identified device and operator, the second information, and the third information. The notification information is information on the identified device having the content determined based on the information on the identified device and operator, the second information, and the third information.

For this reason, the user who exists in the vicinity of one or more output devices that output the notification information and is identified by the second information can be notified of the notification information on a device having the content corresponding to the behavior of the user himself or herself based on the third information in the output mode corresponding to the behavior of the user himself or herself based on the third information.

In the above aspect, the information output device may include a memory that stores in advance identification information that identifies the one or more users and characteristic information including at least one of information indicating a skeleton of the one or more users and information indicating a face in a manner that the identification information and the characteristic information are associated with each other, and the characteristic information of the detected user may be acquired from an image obtained by shooting the detected user, and the identification information corresponding to the acquired characteristic information may be acquired from the memory, and the acquired identification information may be generated as the second information.

According to the present aspect, the second information is generated using the characteristic information acquired from an image obtained by shooting the detected user and the identification information and the characteristic information stored in advance in the memory in association with each other. For this reason, the information output device can acquire the generated second information in the processing of acquiring the second information.

In the above aspect, the third information may be information on first behavior indicating that intention of acquiring information is first degree, information on second behavior indicating that intention of acquiring information is second degree higher than the first degree, or information on third behavior indicating that intention of acquiring information is third degree lower than the first degree.

According to the present aspect, the degree of intention of acquiring information of the user can be grasped from the third information on the behavior of the user identified by the second information. For this reason, the user identified by the second information can be notified of the notification information having the content corresponding to the degree of intention of acquiring information of the user himself or herself in an output mode corresponding to the degree of intention of acquiring information of the user himself or herself.

In the above aspect, a user detected in the vicinity of the one or more output devices may be shot, the third information indicating the second behavior may be generated in a case where recognition time during which a face of the detected user can be recognized from the shot image is the first time or more, the third information indicating the first behavior may be generated in a case where the recognition time is less than the first time, and the third information indicating the third behavior may be generated in a case where, although a face of the detected user cannot be recognized from the shot image, a skeleton of the detected user can be recognized.

According to the present aspect, whether the behavior of the detected user is the first behavior, the second behavior, or the third behavior can be appropriately determined based on the recognition time during which a face of the detected user can be recognized from the image obtained by shooting the detected user and the determination result as to whether or not the face and the skeleton of the detected user can be recognized from the image.

Further, in the above aspect, processing of acquiring twice a clearance between the one or more output devices and the detected user may be performed, the third information indicating information on the second behavior may be generated in a case where the clearance acquired a second time is equal to or less than the clearance acquired a first time, and the third information indicating information on the third behavior may be generated in a case where the clearance acquired a second time is larger than the clearance acquired a first time.

According to the present aspect, based on a result of acquiring a clearance between one or more output devices and the detected user twice, whether the behavior of the detected user is the second behavior or the third behavior can be appropriately determined.

Further, in the above aspect, the one or more output devices may include a display unit that displays information and a voice output unit that outputs voice, and the output mode may include at least one of displaying of the notification information on the display unit and output of voice indicating the notification information by the voice output unit, or non-output of the notification information.

According to the present aspect, the detected user can be notified of the notification information through at least one of sight and hearing. Further, in a case where the output mode is determined to be non-output of the notification information, notifying the detected user of the notification information can be avoided. For this reason, for example, in a case where behavior of the detected the user is behavior in which intention of acquiring information is low, unnecessary notification of the notification information to the user can be prevented.

Further, in the above aspect, the content may include information indicating a state of the identified device or information indicating setting and a state of the identified device.

According to the present aspect, the user who is detected in the vicinity of one or more output devices and identified by the second information can be allowed to grasp information indicating a state of a device identified based on the first information or information indicating setting and a state of the device identified based on the first information.

Further, in the above aspect, fourth information on a history of the one or more output devices detecting the one or more users in the vicinity may be further acquired, and an output device of an output destination of the notification information may be identified based on the fourth information and the second information in a case where a user is detected in the vicinity of a plurality of output devices.

According to the present aspect, an output device to which the notification information is to be output is identified based on a history of detection of the user identified by the second information in the vicinity of a plurality of the output devices. For this reason, the notification information can be output to an output device that is likely to be approached by the user. In this manner, the notification information can be notified to the user more reliably.

Further, in the above aspect, the one or more output devices may include a display unit that displays information, and displaying of the notification information on the display unit may be determined as the output mode, and a state of the identified device may be determined as the content in a case where the second information cannot be acquired.

According to the present aspect, a state of the identified device is displayed even in a case where the user existing in the vicinity of one or more output devices cannot be identified. For this reason, the possibility that the unidentifiable user is allowed to grasp a state of the device can be increased. As a result, the possibility that a state of the device is transmitted from the unidentifiable user to a user who operates the identified device can be increased.

Further, in the above aspect, the first information may include remaining time information indicating remaining time until the one or more devices change to a state in which operation is completed, and the output mode and the content may be determined based on remaining time indicated by the remaining time information on the identified device and the third information.

According to the present aspect, an output mode and content of the notification information on the identified device can be differentiated in consideration of remaining time until the identified device changes to a state in which operation is completed and behavior of the user related to the third information.

Further, in the above aspect, based on elapsed time from a time point at which first notification information on a first device is output until the first device is operated next, a user to which the first notification information is to be re-output may be determined, and the first notification information may be re-output to one or more output devices that detect the determined user in the vicinity.

According to the present aspect, the first notification information can be re-output to an appropriate user in consideration of elapsed time from a time point at which the first notification information on the first device is output until operation of the first device is performed next. For this reason, for example, in a case where the elapsed time is shorter than a predetermined time, the first notification information can be re-output only to the operator of the first device, and, in a case where the elapsed time is equal to or more than the predetermined time, the first notification information can be re-output to all users. In this case, the possibility that any user is allowed to grasp content of the first notification information.

The present disclosure can also be realized as a computer program that causes a computer to execute characteristic processing included in such a method. Further, it goes without saying that such a computer program can be distributed via a computer-readable non-transitory recording medium, such as a CD-ROM, or a communication network, such as the Internet.

Note that all embodiments described below show one specific example of the present disclosure. Numerical values, shapes, constituents, steps, order of steps, and the like described in the embodiments below are merely examples, and are not intended to limit the present disclosure. Further, among the constituents in the embodiments below, constituents not described in an independent claim indicating the highest concept are described as optional constituents.

First Embodiment (1. System Configuration)

First, a configuration of a notification system 100 in a first embodiment will be described. FIG. 1 is a diagram showing an example of an entire configuration of the notification system 100 in the first embodiment.

As shown in FIG. 1, the notification system 100 includes a cloud server 101, one or more panel devices 102 (output device, information output device) used by one or more users 104, and one or more controlled devices 103 (devices) that one or more of the users 104 can operate by using the panel device 102 and the like.

Note that, in the present embodiment, the notification system 100 is used by a family of three members in a house. For example, the user 104 "user A" shown in FIG. 1 is a mother, the user 104 "user B" is a father, and the user 104 "user C" is a child. However, the user 104 who uses the notification system 100 is not limited to this.

The panel device 102 is installed on a wall in the house. For example, the panel device 102 is installed on a wall of a room such as a living room, a kitchen, an entrance, a sanitary room, and a bedroom. Note that the panel device 102 may be installed on a wall of a corridor and the like, unlike the room illustrated here. FIG. 1 shows an example in which three of the panel devices 102 "panel device A", "panel device B", and "panel device C" are provided in a house. However, the number of the panel devices 102 is not limited to three and only needs to be one or more.

The panel device 102 is a device for allowing the user 104 to operate one or more of the controlled devices 103. Further, the panel device 102 is a device that notifies the user 104 of information on one or more of the controlled devices 103.

The panel device 102 includes a display that displays information and a touch panel device that receives touch operation of the user 104 on the display. The display displays an operation state of the controlled device 103. In this manner, an operation state of the controlled device 103 is notified to the user 104. The touch panel device receives touch operation by the user 104. In this manner, the panel device 102 itself and the controlled device 103 connected via a network 110 are operated.

Further, the panel device 102 includes a voice input device such as a microphone, by which the panel device 102 itself and the controlled device 103 connected via the network 110 can be operated by voice input. Further, the panel device 102 includes a voice output device such as a speaker and outputs voice indicating an operation state of the controlled device 103. In this manner, the operation state of the controlled device 103 is notified to the user 104 as a voice message.

Note that a plurality of the controlled devices 103 can be operated simultaneously by one of the panel device 102. Further, from any of the panel device 102 in a house, the operation and operating state of all the controlled devices 103 in the house can be notified. For example, the controlled device 103 in a kitchen can be operated from the panel device 102 set in a living room. Further, an operation state of the controlled device 103 in the kitchen can be notified to the panel device 102 set in a living room.

The controlled device 103 is what is called an Internet of Things (IoT) home appliance that can communicate with the panel device 102 and the cloud server 101 via the network 110 such as a LAN, a wireless LAN, or the Internet. For example, the controlled device 103 includes a washing machine, a microwave oven, an air conditioner, and the like. Note that the controlled device 103 shown here is an example, and the present disclosure is not limited to this.

The controlled device 103 transmits information on operation of the controlled device 103 (hereinafter, operation history information (first information)) to the cloud server 101 via the network 110 when an operation state of the controlled device 103 itself is changed or when the operation state may be changed within a predetermined time by the operation of the panel device 102 by the user 104. The operation history information includes identification information of the user 104 (hereinafter, operator) who operates the controlled device 103, information on an operation state of the controlled device 103, and the like.

The controlled device 103 can be operated not only by operation using the panel device 102 but also by operation of an operation button provided on the controlled device 103. Further, operation via the network 110 from a mobile terminal (not shown) such as a smartphone possessed by the user 104 can also be performed. The controlled device 103 also transmits the operation history information to the cloud server 101 when an operation state of the controlled device 103 itself is changed or when the operation state may be changed within a predetermined time by the operation by the operation button and the portable terminal.

Note that the controlled device 103 may transmit the operation history information not including the identification information of the operator of the controlled device 103 to the cloud server 101 when an operation state of the controlled device 103 itself is changed or when the operation state may be changed within a predetermined time. After that, the identification information of the operator may be included in the operation history information stored in the cloud server 101 by the user 104 performing operation via the network 110 using a mobile terminal or the like.

The cloud server 101 is what is called a virtual server, and is configured to be able to communicate with external devices such as the panel device 102 and the controlled device 103 connected to the network 110. Note that the cloud server 101 is not limited to a virtual server, and may be composed of a plurality of computers physically including a central processing unit (CPU) and a storage device such as a memory, and a hard disk drive (HDD). Further, the cloud server 101 may be a single personal computer.

The cloud server 101 manages huge data (big data) that is difficult to handle with a general database management tool and the like, the operation history information acquired from one or more of the controlled devices 103, and the like.

Further, in addition to the above-described configuration, the panel device 102 is configured to be able to detect the user 104 existing in the vicinity of the panel device 102 and identify the detected user 104. Further, the panel device 102 is configured to be able to acquire information (third information) on the behavior of the detected user 104 (hereinafter, user behavior).

In the present embodiment, the user behavior that the panel device 102 can acquire is assumed to be a behavior that indicates the degree of intention of the user 104 to acquire information from the panel device 102. In the present embodiment, the user behavior is classified into three behaviors, "glancing", "gazing", and "not looking".

The behavior "glancing" is a state in which the user 104 glances at the panel device 102 and is slightly aware of the panel device 102, and is defined as a behavior (first behavior) indicating that the intention of acquiring information from the panel device 102 is medium (first degree). The behavior "gazing" is a state in which the user 104 is gazing at the panel device 102 and is strongly aware of the panel device 102, and is defined as a behavior (second behavior) indicating that the intention of acquiring information from the panel device 102 is at the degree (second degree) higher than the case of the behavior "glancing". The behavior "not looking" is a state in which the user 104 is not looking at the panel device 102 and is not aware of the panel device 102, and is defined as a behavior (third behavior) indicating that the intention of acquiring information from the panel device 102 is at the degree (third degree) lower than the case of the behavior "glancing".

Details of a detection method of the user 104 existing in the vicinity, an identification method of the detected user 104, and an acquisition method of information on the user behavior in the panel device 102 will be described later.

The panel device 102 acquires the operation history information of the controlled device 103 from the cloud server 101 via the network 110. The panel device 102 identifies, on the basis of the acquired operation history information, the controlled device 103 whose state is changed or whose state is changeable within a predetermined time and the operator of the controlled device 103. Based on the information on the identified controlled device 103 and the operator, a user ID (second information) for identifying the user 104 detected in the vicinity, and information on the behavior of the user 104, the panel device 102 determines an output mode and content of the notification information on the identified controlled device 103 to the detected user 104. Then, the panel device 102 outputs the notification information of the determined content in the determined output mode.

(2. Configuration of Panel Device)

Figure 2:
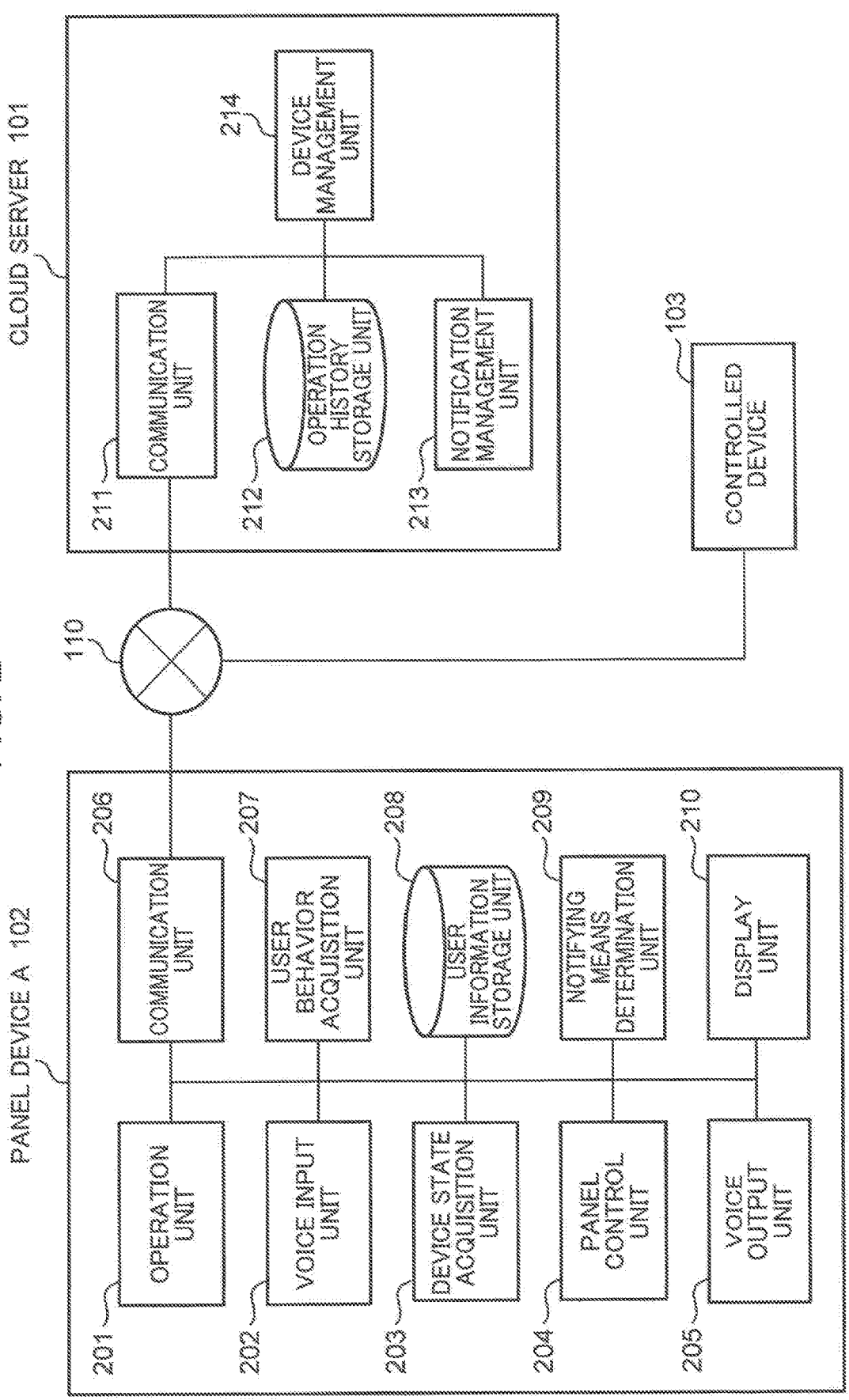
FIG. 2 is a block diagram showing an example of configurations of a panel device and a cloud server.

Next, the configuration of the panel device 102 will be described in detail with reference to FIG. 2. FIG. 2 is a block diagram showing an example of the configurations of the panel device 102 and the cloud server 101.

As shown in FIG. 2, the panel device 102 includes an operation unit 201, a voice input unit 202, a device state acquisition unit 203 (first acquisition unit, identification unit), a panel control unit 204, a voice output unit 205 (output unit), a communication unit 206, a user behavior acquisition unit 207 (third acquisition unit), a user information storage unit 208 (memory), a notifying means determination unit 209 (determination unit), and a display unit 210 (output unit).

The operation unit 201 is composed of, for example, a touch panel device. The operation unit 201 receives touch operation performed by the user 104, and transmits an operation command corresponding to the received touch operation to the controlled device 103 connected via the panel device 102 itself and the network 110.

The communication unit 206 is composed of a communication interface circuit that connects the panel device 102 to the network 110 in a wired or wireless manner, and communicates with the controlled device 103 and the cloud server 101 via the network 110.

The voice input unit 202 is composed of, for example, a microphone such as a stereo microphone, receives voice input by the user 104, and transmits an operation command to the controlled device 103, which is connected via operation of the panel device 102 itself and the network 110.

The display unit 210 is composed of, for example, a liquid crystal display, and displays information instructed by the panel control unit 204.

The voice output unit 205 is composed of, for example, a speaker such as a stereo speaker, and outputs voice instructed by the panel control unit 204.

The user behavior acquisition unit 207 is composed of, for example, a distance measurement sensor, a camera, and a microcomputer, detects the user 104 existing in the vicinity of the panel device 102, identifies the detected user 104, and acquires information on the behavior of the detected user 104.

The user information storage unit 208 is composed of, for example, a storage device such as an HDD or a solid state drive (SSD), and records feature amount data (feature information) of the user 104 used when the user behavior acquisition unit 207 identifies the user 104 in association with a user ID (identification information) for identifying the user 104.

Here, the feature amount data includes, for example, at least one of a feature amount of the skeleton (information indicating the skeleton) and a feature amount of the face (information indicating the face) of each of the users 104 recognized from an image obtained by shooting each of the users 104. Note that the feature amount data of each of the users 104 is created in initial setting performed when the panel device 102 is installed in the house, and is stored in the user information storage unit 208.

The device state acquisition unit 203 is composed of, for example, a microcomputer, make an access to the cloud server 101 via the communication unit 206, and acquires the operation history information of the controlled device 103 stored in the cloud server 101. Then, based on the acquired operation history information, the device state acquisition unit 203 identifies the controlled device 103 whose state is changed or whose state is changeable within a predetermined time among one or more of the controlled devices 103 and the operator who performs operation relating to the change in the state.

The notifying means determination unit 209 is composed of, for example, a microcomputer. Based on the information on the identified controlled device 103 and the operator identified by the device state acquisition unit 203, the user ID of the user 104 detected by the user behavior acquisition unit 207, and the information on the behavior of the detected user 104 acquired from the user behavior acquisition unit 207, the notifying means determination unit 209 determines an output mode and content of the notification information on the identified controlled device 103 to the detected user 104.

In the present embodiment, the output mode of the notification information determined by the notifying means determination unit 209 includes at least one of displaying of the notification information by the display unit 210 and output of voice indicating the notification information by the voice output unit 205, or non-output of the notification information. The content of the notification information determined by the notifying means determination unit 209 includes information indicating an operation state of the controlled device 103 or information indicating the setting and operation state of the controlled device 103.

The panel control unit 204 is composed of, for example, a microcomputer, and outputs the notification information having the content determined by the notifying means determination unit 209 in the output mode determined by the notifying means determination unit 209.

Figure 5A:
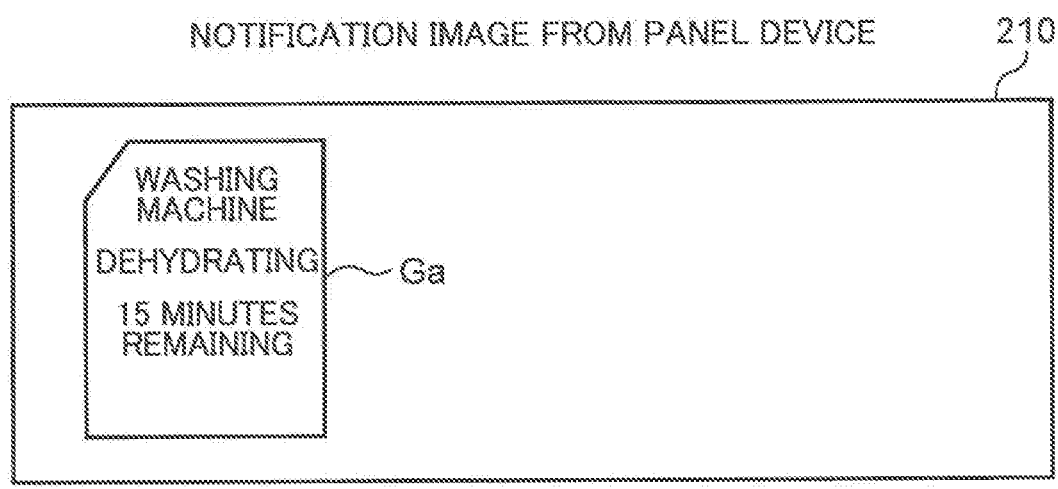
FIG. 5A is a diagram showing an example of an output image of notification information in a summary display notification mode.

Here, an output image of the notification information by the panel device 102 will be described. FIG. 5A is a diagram showing an example of an output image of the notification information in a summary display notification mode. For example, assume that the controlled device 103 identified by the notifying means determination unit 209 is a "washing machine", and an operation state of the controlled device 103 "washing machine" is "dehydrating, 15 minutes remaining". In this case, assume that the notifying means determination unit 209 determines that an output mode of the notification information is displaying of the notification information on the display unit 210, and determines that the content is information indicating the operation state of the controlled device 103. In this case, the panel control unit 204 switches the panel device 102 to the summary display notification mode.

In the summary display notification mode, the panel control unit 204 controls the display unit 210 to display, for example, as shown in FIG. 5A, an image Ga showing the operation state "dehydrating, 15 minutes remaining" of the identified controlled device 103 "washing machine". In the summary display notification mode, the user 104 can visually recognize the operation state of the identified controlled device 103. For this reason, this mode is suitable in a case where, for example, the behavior of the user 104 existing in the vicinity of the panel device 102 is the behavior in which the intention of acquiring information is medium.

Figure 5B:
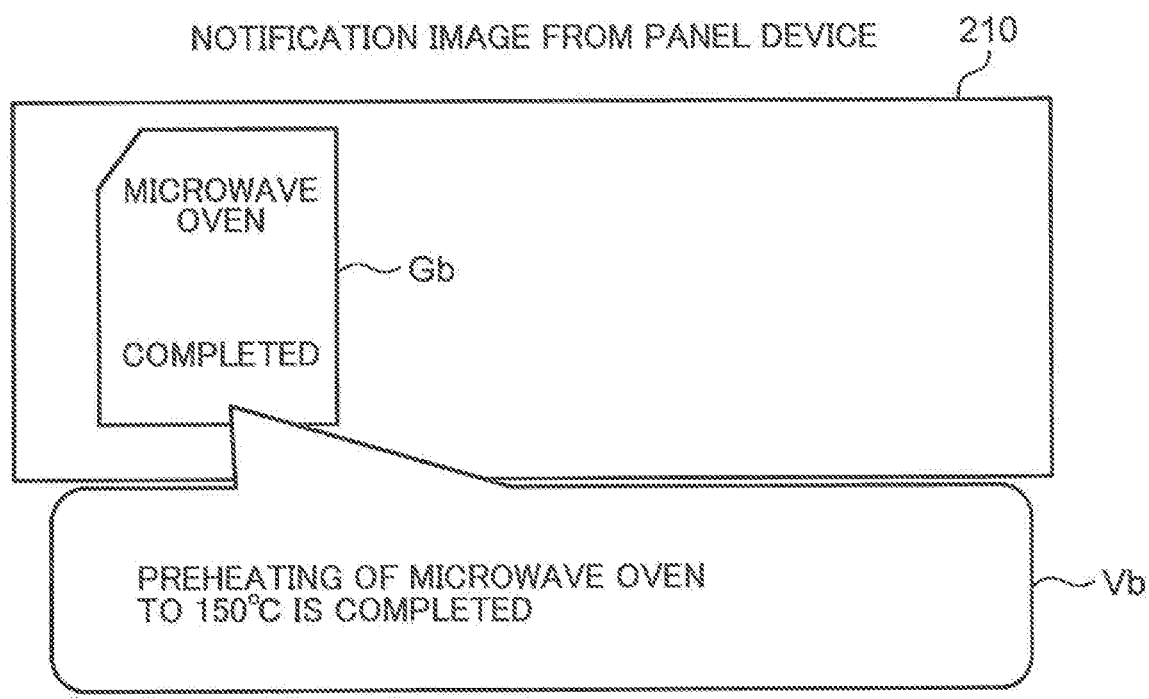
FIG. 5B is a diagram showing an example of an output image of notification information in a voice notification mode.

FIG. 5B is a diagram showing an example of an output image of the notification information in a voice notification mode. For example, assume that the controlled device 103 identified by the notifying means determination unit 209 is a "microwave oven", an operation state of the controlled device 103 "microwave oven" is "completed", and a parameter (hereinafter, setting parameter) indicating the setting of the controlled device 103 "microwave oven" is "preheating oven to 150° C.". In this case, assume that the notifying means determination unit 209 determines that an output mode of the notification information is output of voice indicating the notification information by the voice output unit 205, and determines that the content is information indicating the setting and the operation state of the controlled device 103. In this case, the panel control unit 204 switches the panel device 102 to the voice notification mode.

In the voice notification mode, the panel control unit 204 controls the voice output unit 205, and outputs, for example, as shown in FIG. 5B, a voice message Vb "preheating of microwave oven to 150° C. is completed" indicating the setting parameter "preheating oven to 150° C." and the operation state "completed" of the controlled device 103 "microwave oven". In the voice notification mode, the user 104 can be notified by voice of the setting parameter and the operation state of the controlled device 103. For this reason, this mode is suitable in a case where, for example, the behavior of the user 104 existing in the vicinity of the panel device 102 is the behavior in which the intention of acquiring information is low.

Note that, in the voice notification mode, the panel control unit 204 may control, for example, as shown in FIG. 5B, the display unit 210 to further display an image Gb indicating the operation state "completed" of the controlled device 103 "microwave oven".

Figure 5C:
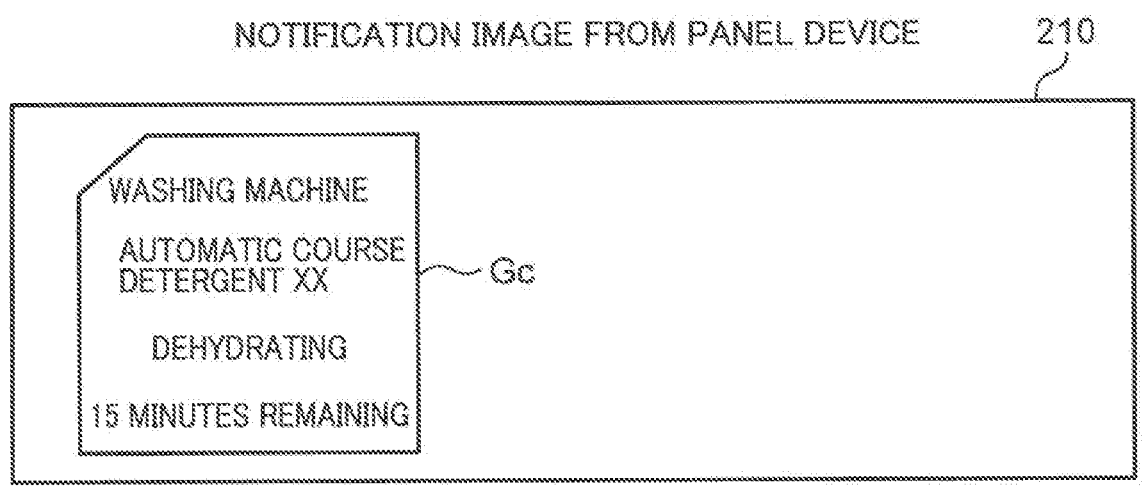
FIG. 5C is a diagram showing an example of an output image of notification information in a detailed display notification mode.

FIG. 5C is a diagram showing an example of an output image of the notification information in a detailed display notification mode. For example, assume that the controlled device 103 identified by the notifying means determination unit 209 is a "washing machine", and an operation state of the controlled device 103 "washing machine" is "dehydrating, 15 minutes remaining". Further, assume that the setting parameter of the controlled device 103 "washing machine" is "automatic course detergent XX". In this case, assume that the notifying means determination unit 209 determines that the output mode is displaying of the notification information on the display unit 210, and determines that the content is information indicating the setting and the operation state of the controlled device 103. In this case, the panel control unit 204 switches the panel device 102 to the detailed display notification mode.

In the detailed display notification mode, the panel control unit 204 controls the display unit 210 to display, for example, as shown in FIG. 5C, an image Gc showing the setting parameter "automatic course detergent XX" and the operation state "dehydrating, 15 minutes remaining" of the identified controlled device 103 "washing machine". In the detailed display notification mode, the user 104 can visually recognize more detailed information on the controlled device 103 than in the summary display notification mode. For this reason, this mode is suitable in a case where, for example, the behavior of the user 104 existing in the vicinity of the panel device 102 is the behavior in which the intention of acquiring information is high.

(3. Cloud Server Configuration)

Next, the configuration of the cloud server 101 will be described in detail with reference to FIG. 2.

As shown in FIG. 2, the cloud server 101 includes a communication unit 211, an operation history storage unit 212, a notification management unit 213, and a device management unit 214.

The communication unit 211 is composed of a communication interface circuit that connects the cloud server 101 to the network 110 in a wired or wireless manner, and communicates with the controlled device 103 and the panel device 102 via the network 110.

The operation history storage unit 212 is composed of, for example, a storage device such as an HDD, and stores the operation history information acquired from each of the controlled devices 103 in the house.

FIG. 4 is a diagram showing an example of an operation history information table T1. As shown in FIG. 4, the operation history storage unit 212 includes the operation history information table T1 for storing the operation history information. The operation history information is information in which an ID, an operation date and time, a house ID, an operator ID, a device ID, a device name, a setting parameter, an operation state, and notification management are associated with each other.

The ID is an identifier (for example, "001") of the operation history information acquired from the controlled device 103. The operation date and time is the date and time when the controlled device 103 is operated (for example, "10:01 on Dec. 17, 2018"). The house ID is an identifier (for example, "H001") of a house to which the user 104 who operates the controlled device 103 belongs. The operator ID is an identifier (for example, "U00A") of the user 104 who operates the controlled device 103. The device ID is an identifier (for example, "D001") of the controlled device 103 that is operated. The device name is a name of the controlled device 103 that is operated (for example, "washing machine", "air conditioner", "microwave oven"). As described above, the operation history information has a structure in which, for each house, one or more of the users 104 belonging to each house can manage a history of operating one or more of the controlled devices 103 belonging to each house.

The setting parameter is a parameter set when the user 104 operates the controlled device 103 (for example, "automatic course detergent XX"). The operation state is information on the operation state of the controlled device 103. The information on the operation state includes the operation state of the controlled device 103 (for example, "dehydrating", "stopped", "completed"), the remaining time required for the controlled device 103 to change to a next operation state (for example, "15 minutes remaining"), and the like.

The notification management is information indicating whether or not the notification information on the controlled device 103 is output by the panel device 102. In the example shown in FIG. 4, the notification management of the controlled device 103 with the device ID "D001" is "yet to be performed". This indicates that the panel device 102 has not output the notification information on the controlled device 103. Further, in the example shown in FIG. 4, the notification management of the controlled device 103 with the device ID "D002" is "-". This indicates that the device is not to be managed as to whether or not the panel device 102 outputs the notification information on the controlled device 103.

The notification management unit 213 manages whether or not the notification information on the controlled device 103 is output by the panel device 102.

Specifically, assume that, after the notification information on the controlled device 103 is output on the panel device 102, any of the users 104 operates the controlled device 103. In this manner, assume that the operation history information newly transmitted by the controlled device 103 is stored in the operation history information table T1 (FIG. 4). In this case, the notification management unit 213 refers to the operation history information transmitted last time by the controlled device 103, which is stored in the operation history information table T1 (FIG. 4). Then, when the notification management of the operation history information that is referred to is "yet to be performed", the notification management unit 213 updates the notification management to "completed". On the other hand, when the notification management of the operation history information that is referred to is "-", the notification management unit 213 performs nothing.

The device management unit 214 manages information on one or more of the controlled devices 103 in the house. The information on the controlled device 103 includes a device ID for identifying the controlled device 103, a name of the controlled device 103, a house ID for identifying a house to which the controlled device 103 belongs, and the like. Further, every time the communication unit 211 receives the operation history information from the controlled device 103, the device management unit 214 stores the received operation history information in the operation history information table T1 (FIG. 4).

(4. Detailed Configuration of the User Behavior Acquisition Unit 207)

Figure 3:
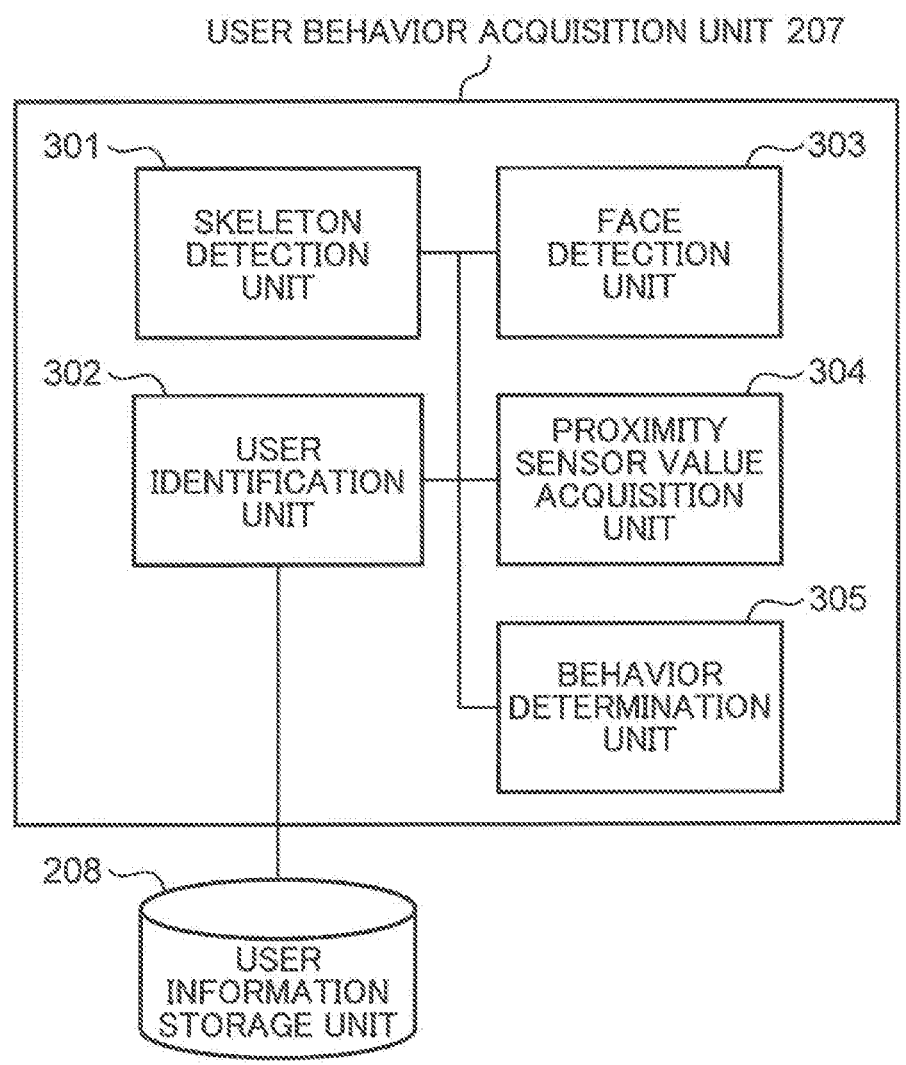
FIG. 3 is a block diagram showing an example of a detailed configuration of a user behavior acquisition unit.

Next, a detailed configuration of the user behavior acquisition unit 207 included in the panel device 102 will be described in detail with reference to FIG. 3. FIG. 3 is a block diagram showing an example of a detailed configuration of the user behavior acquisition unit 207.

As shown in FIG. 3, the user behavior acquisition unit 207 includes a proximity sensor value acquisition unit 304, a skeleton detection unit 301, a user identification unit 302 (second acquisition unit), a face detection unit 303, and a behavior determination unit 305 (third acquisition unit).

The proximity sensor value acquisition unit 304 is what is called a distance measuring sensor, and acquires a clearance from an object existing within a predetermined range from the front surface of the panel device 102. For example, the distance measuring sensor is composed of an infrared sensor that measures a clearance from the object using an infrared ray. Note that the distance measuring sensor is not limited to this, and may be composed of a depth camera that acquires the clearance from an image obtained by shooting the object.

The skeleton detection unit 301 is composed of, for example, a camera and a microcomputer, and detects a feature amount of the skeleton of a person existing in the vicinity of the panel device 102. Specifically, the skeleton detection unit 301 shoots the vicinity of the panel device 102 with a camera and performs publicly-known image recognition processing, so as to detect a feature amount of the skeleton of a person existing in the vicinity of the panel device 102 from the shot image.

The face detection unit 303 is composed of, for example, a camera and a microcomputer, and detects a feature amount of the face of a person existing in the vicinity of the panel device 102. Specifically, the face detection unit 303 shoots the vicinity of the panel device 102 with a camera and performs publicly-known image recognition processing, so as to detect a feature amount of the face of a person existing in the vicinity of the panel device 102 from the shot image.

The user identification unit 302 is composed of a microcomputer and identifies the user 104 existing in the vicinity of the panel device 102. Specifically, the user identification unit 302 acquires, from the user information storage unit 208, a user ID associated with data indicating a feature amount detected by the skeleton detection unit 301 or the face detection unit 303. The user identification unit 302 generates the acquired user ID as a user ID of the user 104 existing in the vicinity of the panel device 102.

The behavior determination unit 305 is composed of a microcomputer, and determines the behavior of the user 104 existing in the vicinity of the panel device 102 based on detection results of the skeleton detection unit 301 and the face detection unit 303 or a clearance acquired by the proximity sensor value acquisition unit 304.

Specifically, the behavior determination unit 305 determines that the behavior of the user 104 existing in the vicinity of the panel device 102 is the behavior "gazing" in a case where the time (recognition time) during which the face detection unit 303 can detect the face of the user 104 is a predetermined first time or longer. In this case, the behavior determination unit 305 generates information indicating that the behavior of the user 104 is the behavior "gazing", and outputs the generated information to the notifying means determination unit 209.

The behavior determination unit 305 determines that the behavior of the user 104 existing in the vicinity of the panel device 102 is the behavior "glancing" in a case where the time during which the face detection unit 303 can detect the face of the user 104 is less than the predetermined first time. In this case, the behavior determination unit 305 generates information indicating that the behavior of the user 104 is the behavior "glancing", and outputs the generated information to the notifying means determination unit 209.

The behavior determination unit 305 determines that the behavior of the user 104 existing in the vicinity of the panel device 102 is the behavior "not looking" in a case where, although the face detection unit 303 cannot detect the face of the user 104, the skeleton detection unit 301 can detect the skeleton of the user 104. In this case, the behavior determination unit 305 generates information indicating that the behavior of the user 104 is the behavior "not looking", and outputs the generated information to the notifying means determination unit 209.

(5. Operation of the Notification System 100)

Next, the operation of the notification system 100 will be specifically described with reference to FIG. 6. FIG. 6 is a flowchart showing entire operation of the notification system 100.

As shown in FIG. 6, the panel device 102 first performs user behavior acquisition processing (Step S101). The user behavior acquisition processing is processing of identifying the user 104 existing in the vicinity of the panel device 102 itself and acquiring information indicating the behavior of the identified user 104.

Next, the panel device 102 performs a notification target identifying processing (Step S102). The notification target identifying processing is processing of acquiring the operation history information from the cloud server 101 and identifying the controlled device 103 to be notified to the panel device 102 and the operator of the controlled device 103 based on the acquired operation history information.

Finally, the panel device 102 performs notifying means determination processing (Step S103). The notifying means determination processing is processing of determining an output mode of the notification information on the panel device 102 and the content of the notification information based on information on the controlled device 103 identified in Step S102 and the operator of the controlled device 103, the user ID of the user 104 identified in Step S101, and the information indicating the behavior of the user 104 acquired in Step S101.

(5-1. User Behavior Acquisition Processing)

Hereinafter, the user behavior acquisition processing will be described in detail with reference to FIG. 7. FIG. 7 is a flowchart showing an example of the user behavior acquisition processing. As shown in FIG. 7, in the user behavior acquisition processing of Step S101 (FIG. 6), first, the panel control unit 204 determines whether or not a person exists in the vicinity of the panel device 102 based on whether or not the proximity sensor value acquisition unit 304 can acquire a clearance (Step S201).

In a case where the proximity sensor value acquisition unit 304 cannot acquire a clearance, the panel control unit 204 determines that no person exists in the vicinity of the panel device 102 (NO in Step S201), and becomes in a standby state. On the other hand, when the proximity sensor value acquisition unit 304 acquires a clearance, the panel control unit 204 determines that a person exists in the vicinity of the panel device 102 (YES in Step S201), and moves the processing to Step S202.

In Step S202, the skeleton detection unit 301 performs skeleton detection processing for detecting a feature amount of the skeleton of a person existing in the vicinity of the panel device 102 (Step S202). Further, the face detection unit 303 performs face detection processing for detecting a feature amount of the face of the person existing in the vicinity of the panel device 102 for a predetermined period (Step S203).

Next, the user identification unit 302 determines whether or not the person existing in the vicinity of the panel device 102 can be identified as the user 104 of the notification system 100 based on the detection results in Steps S202 and S203 (Step S204).

Specifically, in Step S204, the user identification unit 302 performs processing of acquiring, from the user information storage unit 208, a user ID associated with data indicating the feature amount of the skeleton detected in Step S202 or the feature amount of the face detected in Step S203. Here, in a case where one user ID can be acquired, the user identification unit 302 determines that a person existing in the vicinity of the panel device 102 can be identified as the user 104 identified by the acquired user ID (YES in Step S204).

Note that, for example, there is a case where a plurality of user IDs are acquired from the user information storage unit 208 since a plurality of the users 104 exist in an overlapping manner in the vicinity of the panel device 102. In this case, in order to prevent the notification of the notification information from the panel device 102 from being omitted, the user identification unit 302 acquires any one of the user IDs by a predetermined method such as a user ID acquired first.

On the other hand, assume that data indicating the feature amount of the skeleton detected in Step S202 or the feature amount of the face detected in Step S203 is not stored in the user information storage unit 208, and the user identification unit 302 cannot acquire a user ID associated with the data. In this case, the user identification unit 302 determines that the user 104 cannot be identified (NO in Step S204). In this case, the panel control unit 204 switches the panel device 102 to the summary display notification mode (Step S407 (FIG. 9)). In this manner, even in a case where the user 104 in the vicinity of the panel device 102 cannot be identified, the notification information can be notified to the unidentifiable user 104. As a result, the possibility that the content of the notification information is transmitted from the unidentifiable user 104 to the user 104 who operates the controlled device 103 related to the notification information can be increased.

When the user 104 is determined to be identifiable in Step S204 (YES in Step S204), the behavior determination unit 305 determines the behavior of the user 104 detected in Step S201 and identified in Step S204.

Specifically, in Step S203, assume that the face detection unit 303 detects a feature amount of the face of the user 104 one or more times (YES in Step S205), and the time during which the feature amount of the face can be detected is a predetermined first time t1 or more (YES in Step S206). In this case, the behavior determination unit 305 determines that the user 104 in the vicinity of the panel device 102 is looking at the panel device 102 for a long time, and determines the behavior of the user 104 as the behavior "gazing". Then, the behavior determination unit 305 generates information indicating that the behavior of the user 104 is the behavior "gazing", and outputs the generated information to the notifying means determination unit 209 (Step S207).

On the other hand, in Step S203, assume that, although the face detection unit 303 detects a feature amount of the face of the user 104 one or more times (YES in Step S205), the time during which the feature amount of the face can be detected is less than the first time t1 (NO in Step S206). In this case, the behavior determination unit 305 determines that the user 104 in the vicinity of the panel device 102 glances at the panel device 102 or repeats glancing at the panel device 102 a plurality of times, and determines the behavior of the user 104 as the behavior "glancing". Then, the behavior determination unit 305 generates information indicating that the behavior of the user 104 is the behavior "glancing", and outputs the generated information to the notifying means determination unit 209 (Step S208).

Further, assume that the face detection unit 303 does not detect a feature amount of the face in Step S203, and the skeleton detection unit 301 detects a feature amount of the skeleton in Step S202 (NO in Step S205). In this case, the behavior determination unit 305 determines that the user 104 in the vicinity of the panel device 102 looks away from the panel device 102 and does not look at the panel device 102, and determines the behavior of the user 104 as the behavior "not looking". Then, the behavior determination unit 305 generates information indicating that the behavior of the user 104 is the behavior "not looking", and outputs the generated information to the notifying means determination unit 209 (Step S209).

(5-2. Notification Target Identifying Processing)

Hereinafter, the notification target identifying processing will be described in detail with reference to FIG. 8. FIG. 8 is a flowchart showing an example of the notification target identifying processing. As shown in FIG. 8, in the notification target identifying processing of Step S102 (FIG. 6), first, the device state acquisition unit 203 uses the communication unit 206 to acquire the operation history information including a house ID (for example, "H001") of a house in which the panel device 102 is disposed from the operation history information table T1 (FIG. 4) of the cloud server 101 (Step S301).

Next, the device state acquisition unit 203 determines whether or not the operation history information in which the notification management is "yet to be performed" exists in the operation history information acquired in Step S301 (Step S302). In a case where the operation history information in which the notification management is "yet to be performed" is determined not to exist in Step S302 (NO in Step S302), the panel control unit 204 determines that the notification information on the controlled device 103 does not need to be notified to the panel device 102. In this case, the panel control unit 204 finishes the processing without switching the panel device 102 to a notification mode (Step S408 (FIG. 9)). In this manner, notification of the notification information is suppressed with respect to the controlled device 103 corresponding to the operation history information in which the notification management is "completed" or "-" instead of "yet to be performed". Note that the notification mode is a mode for causing the panel device 102 to output the notification information.

On the other hand, assume that the device state acquisition unit 203 determines that the operation history information (FIG. 4) in which the notification management is "yet to be performed" exists in Step S302 (YES in Step S302). In this case, based on the operation history information in which the notification management is "yet to be performed", the device state acquisition unit 203 identifies the controlled device 103 whose operation state is changed or whose operation state is changeable within a predetermined time and the operator who performs operation relating to the change in the operation state (Step S303).

Here, Steps S301 to S303 will be described using a specific example. In the present specific example, assume that the operation history information table T1 stores three pieces of the operation history information shown in FIG. 4. Further, assume that the panel device 102 that performs Steps S301 to S303 is disposed in the house ID "H001". In this case, in Step S301, the device state acquisition unit 203 acquires three pieces of the operation history information shown in FIG. 4 including the house ID "H001" from the operation history information table T1 (FIG. 4).

Next, in Step S302, the device state acquisition unit 203 determines that two pieces of the operation history information with IDs "001" and "003" in which the notification management is "yet to be performed" exist. In this case, in Step S303, the device state acquisition unit 203 refers to the operation state included in the operation history information with the IDs "001" and "003".

The operation state "dehydrating, 15 minutes remaining" included in the operation history information with the ID "001" indicates that the operation state may change to a state in which the dehydration is completed within a predetermined time. For this reason, the device state acquisition unit 203 identifies the controlled device 103 identified by the device ID "D001" and the device name "washing machine" included in the operation history information with the ID "001" as the controlled device 103 in which the operation state is changeable within a predetermined time. Further, the device state acquisition unit 203 acquires an operator ID "U00A" included in the operation history information with the ID "001". Then, the device state acquisition unit 203 identifies the user 104 identified by the acquired operator ID "U00A" as the operator who performs operation relating to the change to the operation state "dehydrating, 15 minutes remaining".

The operation state "completed" included in the operation history information with the ID "003" indicates that the operation state is changed to the state of operation completed. For this reason, the device state acquisition unit 203 identifies the controlled device 103 identified by the device ID "D003" and the device name "microwave oven" included in the operation history information with the ID "003" as the controlled device 103 in which the operation state is changed. Further, the device state acquisition unit 203 acquires an operator ID "U00C" included in the operation history information with the ID "003". Then, the device state acquisition unit 203 identifies the user 104 identified by the acquired operator ID "U00C" as the operator who performs operation relating to the change to the operation state "completed".

As described above, by performing Steps S301 to S303, the device state acquisition unit 203 identifies the controlled device 103 as a notification target whose operation state is changed or whose operation state is changeable within a predetermined time based on the operation history information stored in the cloud server 101. Then, the device state acquisition unit 203 identifies the operator who performs the operation relating to the change in the operation state of the identified controlled device 103.

Next, the device state acquisition unit 203 determines whether or not the user 104 identified in Step S204 (FIG. 7) and the operator identified in Step S303 match with each other (Step S304). Specifically, the device state acquisition unit 203 determines whether or not the operator ID acquired in Step S303 and the user ID acquired by the user identification unit 302 in Step S204 (FIG. 7) match with each other.

Assume that the device state acquisition unit 203 determines that the user 104 identified in Step S204 (FIG. 7) and the operator identified in Step S303 match with each other in Step S304 (YES in Step S304). In this case, the device state acquisition unit 203 finishes the notification target identifying processing of Step S102 (FIG. 6) and moves the processing to Step S103 (FIG. 6).

On the other hand, assume that the device state acquisition unit 203 determines that the user 104 identified in Step S204 (FIG. 7) and the operator identified in Step S303 do not match with each other in Step S304 (NO in Step S304).

In this case, the device state acquisition unit 203 determines whether or not the controlled device 103 whose operation state is "completed" exists among the controlled devices 103 identified in Step S303 (Step S305). Specifically, in Step S305, the device state acquisition unit 203 determines whether or not the operation history information in which the operation state is "completed" exists among pieces of the operation history information that include the device ID of the identified controlled device 103 referred to in Step S303.

Assume that, in Step S305, the controlled device 103 whose operation state is "completed" is determined to exist (YES in Step S305). In this case, the panel control unit 204 prevents the notification information on the controlled device 103 whose operation state is changed to "completed" from being not transmitted to one or more of the users 104 existing in the house. For this reason, the panel control unit 204 finishes the processing after switching the panel device 102 to the voice notification mode (Step S406 (FIG. 9)).

On the other hand, assume that, in Step S305, the device state acquisition unit 203 determines that the controlled device 103 whose operation state is "completed" does not exist (NO in Step S305). In this case, the panel control unit 204 determines that the panel device 102 does not need to be notified of the notification information on the controlled device 103, and finishes the processing without switching the panel device 102 to the notification mode (Step S408 (FIG. 9)).

(5-3. Notifying Means Determination Processing)

Hereinafter, the notifying means determination processing will be described in detail with reference to FIG. 9. FIG. 9 is a flowchart showing an example of the notifying means determination processing. As shown in FIG. 9, in the notifying means determination processing of Step S103 (FIG. 6), first, the device state acquisition unit 203 acquires a remaining time until the controlled device 103 identified in Step S303 (FIG. 8) becomes in a state in which operation is completed (Step S401).

Specifically, in Step S401, the device state acquisition unit 203 refers to an operation state included in the operation history information (FIG. 4) on the controlled device 103 identified in Step S303 (FIG. 8) among pieces of the operation history information (FIG. 4) acquired in Step S302 in which the notification management is "yet to be performed". Then, the device state acquisition unit 203 acquires the remaining time from the operation state that is referred to.

For example, assume that the operation history information table T1 stores three pieces of the operation history information shown in FIG. 4, and in Step S303, the controlled device 103 identified by the device ID "D001" and the device name "washing machine" included in the operation history information with the ID "001" is identified as a notification target. In this case, the operation state "dehydrating, 15 minutes remaining" included in the operation history information of the ID "001" is referred to, and "15 minutes" is acquired as the remaining time.

Note that in a case where information indicating the remaining time is not included in the operation state of the operation history information that is referred to (FIG. 4), and the operation state does not indicate a state that the operation of the controlled device 103 is completed, the device state acquisition unit 203 acquires the remaining time as a predetermined time "m minutes".

Next, based on an acquisition result of the remaining time in Step S401 and information indicating the behavior of the user 104 acquired from the behavior determination unit 305 in Steps S207 to S209 (FIG. 7), the notifying means determination unit 209 determines to which notification mode the panel device 102 is to be switched (Steps S402, S403, and S404).

In a case where the remaining time acquired in Step S401 is equal to or longer than the predetermined time "m minutes" (YES in Step S402), the notifying means determination unit 209 determines a notification mode corresponding to the behavior of the user 104 (Step S403).

Specifically, in a case of acquiring information indicating that the behavior of the user 104 is the behavior "gazing" from the behavior determination unit 305 ("gazing" in Step S403), the notifying means determination unit 209 determines to switch the panel device 102 to the detailed display notification mode. The detailed display notification mode is a mode, in which the output mode of the notification information on the controlled device 103 identified in Step S303 (FIG. 8) is set to display of the notification information on the display unit 210, and the content of the notification information is set to information indicating the setting and an operation state of the controlled device 103. Then, the notifying means determination unit 209 transmits to the panel control unit 204 an instruction to switch the panel device 102 to the detailed display notification mode. The panel control unit 204 switches the panel device 102 to the detailed display notification mode according to the instruction received from the notifying means determination unit 209 (Step S405).

Specifically, in Step S405, the notifying means determination unit 209 acquires, as the content of the notification information on the controlled device 103 identified in Step S303 (FIG. 8), a device name (for example, "washing machine"), a setting parameter (for example, "automatic course detergent XX"), and an operation state (for example, "dehydrating, 15 minutes remaining") of the operation history information (FIG. 4) on the controlled device 103. Then, the notifying means determination unit 209 instructs the panel control unit 204 to display the notification information of the acquired content on the display unit 210. Upon receiving the instruction, the panel control unit 204 controls the display unit 210 to display the image Gc indicating the notification information of the instructed content, as shown in FIG. 5C, for example.

On the other hand, assume that the notifying means determination unit 209 acquires information indicating that the behavior of the user 104 is the behavior "glancing" from the behavior determination unit 305 ("glancing" in Step S403). Alternatively, assume that the user identification unit 302 determines in Step S204 (FIG. 7) that the user 104 cannot be identified. In these cases, the notifying means determination unit 209 determines to switch the panel device 102 to the summary display notification mode. The summary display notification mode is a mode, in which the output mode of the notification information on the controlled device 103 identified in Step S303 (FIG. 8) is set to display of the notification information on the display unit 210, and the content of the notification information is set to information indicating an operation state of the controlled device 103. Then, the notifying means determination unit 209 transmits to the panel control unit 204 an instruction to switch the panel device 102 to the summary display notification mode. The panel control unit 204 switches the panel device 102 to the summary display notification mode according to the instruction received from the notifying means determination unit 209 (Step S407).

Specifically, in Step S407, the notifying means determination unit 209 acquires, as the content of the notification information on the controlled device 103 identified in Step S303 (FIG. 8), a device name (for example, "washing machine") and an operation state (for example, "dehydrating, 15 minutes remaining") of the operation history information (FIG. 4) on the controlled device 103. Then, the notifying means determination unit 209 instructs the panel control unit 204 to display the notification information of the acquired content on the display unit 210. Upon receiving the instruction, the panel control unit 204 controls the display unit 210 to display the image Ga indicating the notification information of the instructed content, as shown in FIG. 5A, for example.

Further, assume that the notifying means determination unit 209 acquires information indicating that the behavior of the user 104 is the behavior "not looking" from the behavior determination unit 305 ("not looking" in Step S403). In this case, the notifying means determination unit 209 determines an output mode of the notification information on the controlled device 103 identified in Step S303 (FIG. 8) to be non-output of the notification information. In this case, the notifying means determination unit 209 does not transmit to the panel control unit 204 an instruction to switch the panel device 102 to the notification mode. For this reason, the panel control unit 204 finishes the processing without switching the panel device 102 to the notification mode (Step S408). In this manner, unnecessary notification of the notification information to the user 104 who behaves with a low intention of acquiring information can be avoided.

Furthermore, assume that the remaining time acquired by the notifying means determination unit 209 in Step S401 is less than the predetermined time "m minutes". Alternatively, assume that the operation state referred to by the notifying means determination unit 209 in Step S401 indicates a state in which the operation is completed (NO in Step S402). In these cases, the notifying means determination unit 209 determines the notification mode corresponding to the behavior of the user 104 determined in Step S101 (Step S404).

Specifically, in a case of acquiring information indicating that the behavior of the user 104 is the behavior "gazing" from the behavior determination unit 305 ("gazing" in Step S404), the notifying means determination unit 209 performs Step S405 described above. On the other hand, in a case where the notifying means determination unit 209 acquires information indicating that the behavior of the user 104 is the behavior "glancing" from the behavior determination unit 305 ("glancing" in Step S404), Step S407 described above is performed.

Further, in a case of acquiring information indicating that the behavior of the user 104 is the behavior "not looking" from the behavior determination unit 305 ("not looking" in Step S404), the notifying means determination unit 209 determines to switch the panel device 102 to the voice notification mode. The voice notification mode is a mode, in which the output mode of the notification information on the controlled device 103 identified in Step S303 (FIG. 8) is set to output of voice indicating the notification information by the voice output unit 205, and the content of the notification information is set to information indicating the setting and an operation state of the controlled device 103. Then, the notifying means determination unit 209 transmits to the panel control unit 204 an instruction to switch the panel device 102 to the voice notification mode. The panel control unit 204 switches the panel device 102 to the voice notification mode according to the instruction received from the notifying means determination unit 209 (Step S406).

Specifically, in Step S406, the notifying means determination unit 209 acquires, as the content of the notification information on the controlled device 103 identified in Step S303 (FIG. 8), a device name (for example, "microwave oven"), a setting parameter (for example, "preheating oven to 150° C."), and an operation state (for example, "completed") of the operation history information (FIG. 4) on the controlled device 103. Then, the notifying means determination unit 209 instructs the panel control unit 204 to cause the voice output unit 205 to output a voice message indicating the notification information of the acquired content. Upon receiving the instruction, the panel control unit 204 controls the voice output unit 205 to output the voice message Vb indicating the notification information of the instructed content, as shown in FIG. 5B, for example.

Note that the voice message indicating the notification information may be generated by the cloud server 101. Then, the panel control unit 204 may acquire the generated voice message Vb from the cloud server 101. Further, in a case of switching the panel device 102 to the voice notification mode, the panel control unit 204 may further display the image Gb indicating the operation state of the controlled device 103, as shown in FIG. 5B, for example.

According to the configuration of the above embodiment, based on the operation history information, the controlled device 103 whose state is changed or whose state is changeable within a predetermined time among one or more of the controlled devices 103 and the operator who performs operation relating to the change in the state are identified. Then, the notification information is output to the panel device 102 that detects the user 104 in the vicinity. The output mode and content of the notification information are determined based on the information on the identified controlled device 103 and the operator, and the user ID of the detected user 104 and the determination result of the behavior of the detected user 104. For this reason, the user 104 existing in the vicinity of the panel device 102 that outputs the notification information can be notified of the information on the controlled device 103 having the content corresponding to the behavior of the user himself or herself in the output mode corresponding to the behavior of the user himself or herself.

Modified Embodiment

Note that the above embodiment is merely an example of the embodiment according to the present disclosure, and is not intended to limit the present disclosure to the above embodiment. The embodiment according to the present disclosure may be, for example, a modified embodiment described below. Note that, in the description hereinafter, constituents similar to those described above will be attached with the same reference numerals and the description of the constituents will be omitted.

(1) The cloud server 101 may include a storage unit similar to the user information storage unit 208 (FIG. 2). Alternatively, what is called an edge server capable of communicating with one or more of the panel devices 102 in the house and one or more of the controlled devices 103 and the cloud server 101 via the network 110 may be provided in the house. Then, the edge server may include a storage unit similar to the user information storage unit 208 (FIG. 2).

In accordance with this, the user behavior acquisition unit 207 (FIGS. 2 and 3) may transmit an image shot by a camera to the cloud server 101 (or edge server). Then, the cloud server 101 (or edge server) may perform processing similar to that of the skeleton detection unit 301, the user identification unit 302, the face detection unit 303, and the behavior determination unit 305 (FIG. 3) based on the image received by the communication unit 211 and the information stored in its own storage unit.

(2) Instead of the skeleton detection unit 301 and the face detection unit 303, a detection unit that detects a feature amount of a person existing in the vicinity of the panel device 102 may be provided. For example, the detection unit is preferably configured to include a camera, a microphone, a microcomputer, and the like. Then, the detection unit is preferably configured to detect a feature amount of a retina, a height, voice or the like of a person from an image of the user 104 existing in the vicinity of the panel device 102 shot by a camera and voice of the user 104 existing in the vicinity of the panel device 102 uttered with a microphone.

In accordance with this, data indicating the feature amount of a retina, a height, voice, or the like of each of the users 104 is preferably created in the initial setting performed when the panel device 102 is installed in the house. Then, the created data is preferably stored in the user information storage unit 208 in association with the user ID of each of the users 104 in advance. Further, the user identification unit 302 (FIG. 3) preferably uses a detection result of the detection unit instead of a detection result of the skeleton detection unit 301 and the face detection unit 303.

(3) The information notified from the panel device 102 to the user 104 is not limited to the information on the setting and the state of the controlled device 103 identified in Step S303 (FIG. 8). For example, assume that there is information (first information) that can be associated with the operation of the identified controlled device 103 among pieces of information that are provided by a service used by the user 104 and that the panel device 102 can acquire from the cloud server 101. In this case, the information that can be associated may be included in the information notified from the panel device 102 to the user 104.

For example, assume that there is information indicating the delivery status of a product relating to the operation of the identified controlled device 103 among pieces of delivery information that are provided by a delivery service used by the user 104 and that the panel device 102 can acquire from the cloud server 101. In this case, the notification information on the identified controlled device 103 may include information indicating the delivery status of the product. Note that the products include, for example, a detergent used in operation of a washing process of a washing machine, ingredients such as a meal kit used in cooking operation using a microwave oven, a replacement filter necessary for cleaning operation with a vacuum cleaner, and the like.

(4) The operation history information (FIG. 4) may further include attribute information indicating whether or not the device requires notification to all users. Then, the notifying means determination unit 209 may determine the output mode and content of the notification information based on the attribute information.

Specifically, the operation history information on an interphone having attributes that require an immediate response preferably includes the attribute information indicating that the device requires notification to all users. Further, similar attribute information is preferably included in the operation history information on the controlled device 103 installed in sanitary space such as a bathroom having the attribute of being used by all the users 104 in the house.

Then, in Step S304 (FIG. 8), assume that the user 104 existing in the vicinity of the panel device 102 and the operator do not match with each other. In this case, the notifying means determination unit 209 preferably determines whether or not the operation history information on the controlled device 103 identified in Step S303 (FIG. 8) includes attribute information indicating that the device requires notification to all users (hereinafter, all user attribute information). Then, in a case where the all user attribute information is included, the processing is preferably continued in a similar manner as the case where the user 104 in the vicinity and the operator are determined to match with each other in Step S304 (FIG. 8) (YES in Step S304).

(5) When operating the controlled device 103, the operator may be able to preset the user 104 to be notified of the notification information on the controlled device 103. Then, if the user 104 detected in the vicinity of the panel device 102 is the user 104 set as the user 104 to be notified, the notification information on the controlled device 103 may be notified.

Specifically, the operation history information (FIG. 4) preferably includes the user ID (hereinafter, notification target person ID) of the user 104 who is to be notified of the information on the controlled device 103 as designated by the operator of the controlled device 103.

Then, in Step S304 (FIG. 8), assume that the user 104 existing in the vicinity of the panel device 102 and the operator do not match with each other. In this case, the notifying means determination unit 209 preferably determines whether or not the notification target person ID included in the operation history information on the controlled device 103 identified in Step S303 (FIG. 8) and the user ID of the user 104 existing in the vicinity of the panel device 102 match with each other. Then, in a case where the IDs match with each other, the processing is preferably continued in a similar manner as the case where the user 104 in the vicinity and the operator are determined to match with each other in Step S304 (FIG. 8) (YES in Step S304).

(6) Based on an elapsed time from a time point at which the notification information (first notification information) including the information indicating the operation completion state of the controlled device 103 (first device) is output until the controlled device 103 is operated next, the user 104 to whom the notification information is to be re-notified (re-output) may be determined. Then, the notification information may be re-notified to one or more of the panel devices 102 that detect the determined user 104 in the vicinity.

Specifically, when the notification management unit 213 changes the notification management of the operation history information to "completed", change date and time information indicating the date and time at the time of the change is preferably further stored in association with the operation history information.

Then, in Step S304 (FIG. 8), assume that the user 104 existing in the vicinity of the panel device 102 and the operator do not match with each other. In this case, the notifying means determination unit 209 preferably determines whether or not an elapsed time from the date and time indicated by the change date and time information associated with the operation history information on the controlled device 103 identified in Step S303 (FIG. 8) is equal to or more than a predetermined time.

Then, in a case where the elapsed time is determined to be equal to or more than the predetermined time in the above determination, the processing is preferably continued in a similar manner as the case where the user 104 in the vicinity and the operator are determined to match with each other in Step S304 (FIG. 8) (YES in Step S304). For example, assume that no operation has been performed for the predetermined time or more from the time point at which the notification information including the information indicating the operation completion state of the controlled device 103 is output. In this case, in the present specific example, no matter who the user 104 identified in Step S204 is, the fact that the controlled device 103 is in the operation completed state can be re-notified.

(7) The schedule data of the user 104 may be stored in the cloud server 101, and the notifying means determination unit 209 may determine the content of the notification information in conjunction with the schedule data.

For example, assume that the cloud server 101 stores schedule data for putting a child to sleep at 21:00 every day. In this case, as preparation for dinner is started a predetermined time (for example, three hours) before the time when the child is put to sleep, the notifying means determination unit 209 may set a time (for example, 18:00) a predetermined time before the time when the child is put to sleep as an operation time of a rice cooker. Then, when the notifying means determination unit 209 determines the content of the notification information at a time point close to the operation time of the rice cooker, the fact that the operation of the rice cooker is necessary may be included in the content of the notification information as a piece of advice for preparing a dinner.

(8) Assume that the behavior of the user 104 is determined to be the behavior "gazing" in Step S207 (FIG. 7). After the above, assume that, during a period until the notification information including the information indicating that the operation of the controlled device 103 identified in Step S303 (FIG. 8) is completed is output, the behavior of the user 104 is determined to be the behavior "glancing" in Step S208 (FIG. 7). In this case, the behavior determination unit 305 may determine that the behavior of the user 104 is the behavior "gazing" again, assuming that the degree of intention of acquiring the information of the user 104 is still high.

(9) The user behavior acquisition unit 207 may determine that the behavior of the user 104 is the behavior "gazing" in a case where the user 104 is approaching the panel device 102. Further, the user behavior acquisition unit 207 may determine that the behavior of the user 104 is the behavior "not looking" in a case where the user 104 is moving away from the panel device 102.

Specifically, assume that the user 104 in the vicinity of the panel device 102 is identified in Step S204 (FIG. 7) (YES in Step S204). In this case, the behavior determination unit 305 (FIG. 3) preferably performs processing of acquiring a clearance between the panel device 102 and the user 104 in the vicinity from the proximity sensor value acquisition unit 304 twice.

Then, assume that the clearance acquired the second time is equal to or smaller than the clearance acquired the first time. In this case, the identified user 104 is considered to approach the panel device 102 and behave to increase the degree of intention of acquiring information. Therefore, in this case, the behavior determination unit 305 (FIG. 3) preferably determines that the behavior of the user 104 is the behavior "gazing", as in Step S207 (FIG. 7).

On the other hand, assume that the clearance acquired the second time is larger than the clearance acquired the first time. In this case, the user 104 identified in Step S204 is considered to move away from the panel device 102 and behave to lower the degree of intention of acquiring information. Therefore, in this case, the behavior determination unit 305 (FIG. 3) preferably determines that the behavior of the user 104 is the behavior "not looking", as in Step S209 (FIG. 7).

(10) For example, there is a case where one of the user 104 is detected at the same time in the vicinity of a plurality of the panel devices 102 such as two of the panel devices 102 provided in a living room and a bedroom adjacent to each other. In this case, the panel device 102 that outputs the notification information may be determined based on a detection history of the detected user 104.

Specifically, detection history information (fourth information) is preferably stored in a storage device (memory) such as an HDD that constitutes the operation history storage unit 212 in the cloud server 101. The detection history information is information, in which a user ID that identifies the user 104, a panel ID that identifies the panel device 102 that detects the user 104 in the vicinity, and the number of times the panel device 102 detects the user 104 are associated with each other.

Then, assume that the user 104 existing in the vicinity of the panel device 102 is identified in Step S204 (FIG. 7). In this case, the panel control unit 204 preferably transmits the user ID of the user 104 and the panel ID of the panel device 102 to the cloud server 101. Then, in the cloud server 101, every time the user ID and the panel ID are received, the number of times of the detection of the detection history information including the received user ID and panel ID is preferably incremented by one.

Then, before switching the notification mode in Steps S405, S406, and S407, the panel control unit 204 preferably acquires the detection history information including the user ID acquired in Step S204 (FIG. 7) from the cloud server 101. Then, the panel control unit 204 preferably refers to the panel ID included in the detection history information having a largest number of times of detection among pieces of the acquired detection history information.

Then, the panel control unit 204 preferably performs switching of the notification mode in Steps S405, S406, and S407 in a case where the panel ID that is referred to matches with the panel ID of the panel device 102 including itself. On the other hand, the panel control unit 204 preferably does not perform switching of the notification mode in Steps S405, S406, and S407 in a case where the panel ID that is referred to does not match with the panel ID of the panel device 102 including itself. In this case, the notification information can be output to the panel device 102 that is most likely to be approached by the user 104. In this manner, the notification information can be notified to the user 104 more reliably.

However, without limitation to the above, all the panel devices 102 that simultaneously detect the same user 104 may output the notification information.

(11) The content of the notification information may be increased as the time during which the behavior of the user 104 is the behavior "gazing" becomes longer.

For example, assume that the behavior of the user 104 is determined to be the behavior "gazing", and, in Step S405 (FIG. 9), the panel control unit 204 switches the panel device 102 to the detailed display notification mode. In this case, the panel control unit 204 preferably first displays the notification information including only the information indicating the state of the controlled device 103, as in the summary display notification mode. Then, when the time during which the behavior of the user 104 is determined to be the behavior "gazing" becomes longer than a predetermined time, the panel control unit 204 may additionally display the information indicating the setting of the controlled device 103.

(12) In the above aspect, a technique realized by the cloud server 101 may be realized by types of cloud services like, for example, an infrastructure as a service (Iaas), a platform as a service (Paas), and software as a service (Saas). However, the types of cloud services that realize the technique described in the above aspect are not limited to these.

INDUSTRIAL APPLICABILITY

The notification system and the notification method according to the present disclosure are useful in a residence and the like where one or more users share one or more devices and perform daily activities.

The invention claimed is:

1. An information output method in an information output device that outputs information to an output device used by a user, the information output method comprising:
    acquiring first information on an operation history of one or more objects operated by one or more users;
    acquiring second information that identifies a user who uses the output device;
    acquiring third information on behavior of the user who uses the output device;
    identifying an object whose state is changed or whose state is changeable within a predetermined time among the one or more objects and an operator who performs operation relating to the change in the state based on the first information;

determining content of notification information on the identified object to the user who uses the output device based on information on the identified object and the identified operator, the second information, and the third information; and outputting notification information having the determined content to the output device, wherein in the acquisition of the second information, an image obtained by shooting the user who uses the output device is acquired, characteristic information including at least one of information indicating a skeleton and information indicating a face of the user who uses the output device is acquired from the image, information, in which identification information identifying the one or more users is associated in advance with the characteristic information, is referred to, whereby identification information corresponding to the characteristic information acquired from the image is identified, the identified identification information is generated as the second information, the third information is based on the image obtained by shooting the user who uses the output device and is information on a first behavior indicating that a degree of intention of the user who uses the output device of acquiring information from the output device is a first degree, information on a second behavior indicating that the degree of intention of the user who uses the output device of acquiring information from the output device is a second degree higher than the first degree, or information on a third behavior indicating that the degree of intention of the user who uses the output device of acquiring information from the output device is a third degree lower than the first degree, in the acquisition of the third information, the image obtained by shooting the user who uses the output device is acquired, the third information indicating the second behavior is generated in a case where recognition time during which a face of the user who uses the output device can be recognized from the image is the first time or more, the third information indicating the first behavior is generated in a case where the recognition time is less than the first time, and the third information indicating the third behavior is generated in a case where, although a face of the user who uses the output device cannot be recognized from the image, a skeleton of the user who uses the output device can be recognized.

2. The information output method according to claim 1, further comprising:

determining an output mode of the notification information based on information on the identified object and operator, the second information, and the third information, and outputting, in the determined output mode, the notification information to the output device.

3. The information output method according to claim 1, further comprising:

performing processing of acquiring twice a clearance between the output device and the user who uses the output device;

generating the third information indicating information on the second behavior in a case where the clearance acquired a second time is equal to or less than the clearance acquired a first time; and generating the third information indicating information on the third behavior in a case where the clearance acquired a second time is larger than the clearance acquired a first time.

4. The information output method according to claim 2, wherein the output device includes a display unit that displays information and a voice output unit that outputs voice, and the output mode includes at least one of displaying of the notification information on the display unit and output of voice indicating the notification information by the voice output unit, or non-output of the notification information.

5. The information output method according to claim 1, wherein the content includes information indicating a state of the identified object or information indicating setting and a state of the identified object.

6. The information output method according to claim 1, further comprising:

further acquiring fourth information on a history of a usage of one or more output devices by the one or more users; and identifying an output device of an output destination of the notification information based on the fourth information and the second information in a case where a user uses a plurality of output devices.

7. The information output method according to claim 2, wherein the output device includes a display unit that displays information, the information output method further comprising:

determining displaying of the notification information on the display unit as the output mode, and determining a state of the identified device as the content in a case where the second information cannot be acquired.

8. The information output method according to claim 2, wherein the first information includes remaining time information indicating remaining time until the one or more objects change to a state in which operation is completed, the information output method further comprising:

determining the output mode and the content based on remaining time indicated by the remaining time information on the identified object and the third information.

9. The information output method according to claim 1, further comprising:

determining, based on elapsed time from a time point at which first notification information on a first object is output until the first object is operated next, a user to which the first notification information is to be re-output; and re-outputting the first notification information to one or more output devices used by the determined user.

10. An information output device that outputs information to an output device used by a user, the information output device comprising:

a computer that implements:

a first acquisition unit that acquires first information on an operation history of one or more objects operated by one or more users;

a second acquisition unit that performs processing of acquiring second information that identifies a user who uses the output device;

a third acquisition unit that acquires third information on behavior of the user who uses the output device;

an identification unit that identifies an object whose state is changed or whose state is changeable within a predetermined time among the one or more objects and an operator who performs operation relating to the change in the state based on the first information;

a determination unit that determines content of notification information on the identified object to the user who uses the output device based on information on the identified object and the identified operator, the second information, and the third information; and an output unit that outputs notification information having the determined content to the output device, wherein the second acquisition unit acquires an image obtained by shooting the user who uses the output device, acquires, from the image, characteristic information including at least one of information indicating a skeleton and information indicating a face of the user who uses the output device, identifies, by referring to information in which identification information identifying the one or more users is associated in advance with the characteristic information, identification information corresponding to the characteristic information acquired from the image, and generates the identified identification information as the second information, the third information is based on the image obtained by shooting the user who uses the output device and is information on a first behavior indicating that a degree of intention of the user who uses the output device of acquiring information from the output device is a first degree, information on a second behavior indicating that the degree of intention of the user who uses the output device of acquiring information from the output device is a second degree higher than the first degree, or information on a third behavior indicating that the degree of intention of the user who uses the output device of acquiring information from the output device is a third degree lower than the first degree, and the third acquisition part acquires the image obtained by shooting the user who uses the output device, generates the third information indicating the second behavior in a case where recognition time during which a face of the user who uses the output device can be recognized from the image is the first time or more, generates the third information indicating the first behavior in a case where the recognition time is less than the first time, and the third information indicating the third behavior is generated in a case where, although a face of the user who uses the output device cannot be recognized from the image, a skeleton of the user who uses the output device can be recognized.

11. A non-transitory computer readable storage medium storing a program for causing a computer to execute the information output method according to claim 1.

* * * * *